(12) United States Patent
Raab

(10) Patent No.: US 6,535,794 B1
(45) Date of Patent: Mar. 18, 2003

(54) METHOD OF GENERATING AN ERROR MAP FOR CALIBRATION OF A ROBOT OR MULTI-AXIS MACHINING CENTER

(75) Inventor: Simon Raab, Longwood, FL (US)

(73) Assignee: Faro Technologoies Inc., Lake Mary, FL (US)

( * ) Notice: Subject to any disclaimer, the term of this patent is extended or adjusted under 35 U.S.C. 154(b) by 0 days.

(21) Appl. No.: 08/434,010

(22) Filed: May 3, 1995

Related U.S. Application Data

(63) Continuation-in-part of application No. 08/112,394, filed on Oct. 26, 1993, which is a continuation-in-part of application No. 08/021,949, filed on Feb. 23, 1993, now Pat. No. 5,402,582.

(51) Int. Cl.[7] .......................... G05B 15/00; G06F 19/00
(52) U.S. Cl. ............................ 700/262; 702/97; 33/502
(58) Field of Search ....................... 364/474.03, 474.05, 364/167.01, 191; 395/80, 88, 89, 99

(56) References Cited

U.S. PATENT DOCUMENTS

| | | |
|---|---|---|
| 2,906,179 A | 9/1959 | Bower |
| 3,531,868 A | 10/1970 | Stevenson |
| 3,890,958 A | 6/1975 | Fister et al. |
| 3,944,798 A | 3/1976 | Eaton |
| 4,135,498 A | 1/1979 | McGee |
| 4,224,670 A | 9/1980 | Yamazaki ............... 364/474.03 |
| 4,362,977 A | 12/1982 | Evans et al. ................ 700/254 |
| 4,384,407 A | 5/1983 | Miyamoto .................... 33/174 |
| 4,394,608 A | 7/1983 | Tryber et al. .......... 364/474.03 |
| 4,408,286 A | 10/1983 | Kikuchi et al. ............. 364/513 |
| 4,425,713 A | 1/1984 | Rotella |
| 4,430,796 A | 2/1984 | Nakagawa ........................ 33/1 |
| 4,467,432 A | 8/1984 | Imazeki et al. ......... 364/474.03 |
| 4,495,588 A | 1/1985 | Nio et al. .................... 364/191 |
| 4,528,632 A | 7/1985 | Nio et al. .................... 364/169 |
| 4,571,834 A | 2/1986 | Fraser et al. |
| 4,589,810 A | 5/1986 | Heindl et al. ................... 414/5 |

(List continued on next page.)

FOREIGN PATENT DOCUMENTS

| | | |
|---|---|---|
| DE | 3045094 | 7/1982 |
| DE | 3223896 | 1/1984 |
| DE | 41 10 741 A1 | 12/1991 |

(List continued on next page.)

OTHER PUBLICATIONS

Zhong, Neuro–Accuracy Compensator for Industrial Robots, International Conference on Neural Networks, Jun. 27,1994.

(List continued on next page.)

*Primary Examiner*—Leo Picard
*Assistant Examiner*—Sheela Rao
(74) *Attorney, Agent, or Firm*—Cantor Colburn LLP

(57) ABSTRACT

A novel, portable coordinate measuring machine comprises a multijointed (preferably six joints) manually positionable measuring arm for accurately and easily measuring a volume, which in a preferred embodiment, comprises a sphere ranging from six to eight feet in diameter and a measuring accuracy of 2 Sigma +/–0.005 inch. In addition to the measuring arm, the present invention employs a controller (or serial box) which acts as the electronic interface between the arm and a host computer. The coordinate measuring machine of this invention is particularly useful in a novel method of generating an error map and thus correcting and/or programming the tool path for multi-axis machining centers, particularly robots.

7 Claims, 23 Drawing Sheets

U.S. PATENT DOCUMENTS

| | | | |
|---|---|---|---|
| 4,638,798 A | 1/1987 | Sheldon et al. | |
| 4,653,011 A | 3/1987 | Iwano | |
| 4,670,851 A | 6/1987 | Murakami et al. | 364/518 |
| 4,676,002 A | 6/1987 | Slocum | 33/503 |
| 4,677,276 A | 6/1987 | Nio et al. | 219/125.12 |
| 4,679,331 A | 7/1987 | Koontz | 33/503 |
| 4,703,443 A | 10/1987 | Morivasu | 364/559 |
| 4,750,487 A | 6/1988 | Zanetti | |
| 4,761,596 A | 8/1988 | Nio et al. | 318/568 |
| 4,769,763 A | 9/1988 | Trieb et al. | 364/559 |
| 4,791,934 A | 12/1988 | Brunnett | |
| 4,819,195 A | 4/1989 | Bell et al. | 33/503 |
| 4,886,529 A | 12/1989 | Hashimoto et al. | 51/165.71 |
| 4,888,877 A | 12/1989 | Enderle et al. | 33/504 |
| 4,891,889 A | 1/1990 | Tomelleri | 33/504 |
| 4,937,759 A * | 6/1990 | Vold | 364/513 |
| 4,942,545 A | 7/1990 | Sapia | 33/504 |
| 4,945,501 A | 7/1990 | Bell et al. | |
| 4,962,591 A | 10/1990 | Zeller et al. | 33/502 |
| 4,969,108 A | 11/1990 | Webb et al. | 364/513 |
| 4,970,448 A | 11/1990 | Turii et al. | 364/167.01 |
| 4,972,311 A * | 11/1990 | Holdgrafer et al. | 364/167.01 |
| 4,975,856 A | 12/1990 | Vold et al. | 364/474.36 |
| 4,982,504 A | 1/1991 | Soderberg et al. | 33/503 |
| 4,991,579 A | 2/1991 | Allen | 128/653 |
| 4,998,050 A | 3/1991 | Nishiyama et al. | 318/568.1 |
| 5,007,006 A * | 4/1991 | Taylor et al. | 364/571 |
| 5,016,199 A | 5/1991 | McMutry et al. | 364/474.03 |
| 5,040,306 A | 8/1991 | McMurtry et al. | 33/556 |
| 5,050,608 A | 9/1991 | Watanabe et al. | |
| 5,088,046 A | 2/1992 | McMurtry | |
| 5,088,055 A | 2/1992 | Ovama | |
| 5,105,368 A | 4/1992 | Alexandersen et al. | 700/254 |
| 5,131,844 A | 7/1992 | Marinaccio et al. | |
| 5,148,377 A | 9/1992 | McDonald | |
| 5,179,653 A | 1/1993 | Fuller | 395/156 |
| 5,187,874 A | 2/1993 | Takahashi et al. | 33/503 |
| 5,189,806 A | 3/1993 | McMurtry et al. | |
| 5,204,824 A | 4/1993 | Fujimaki | |
| 5,230,338 A | 7/1993 | Allen et al. | 128/653 |
| 5,230,623 A | 7/1993 | Guthrie et al. | |
| 5,231,693 A | 7/1993 | Backes et al. | 395/99 |
| 5,241,484 A | 8/1993 | Matsuura et al. | 364/474.03 |
| 5,241,485 A | 8/1993 | Matsuura | |
| 5,251,127 A | 10/1993 | Raab | 364/413.13 |
| 5,251,156 A | 10/1993 | Heier et al. | |
| 5,259,120 A * | 11/1993 | Chapman et al. | 33/502 |
| 5,303,333 A | 4/1994 | Hoos | 364/167.01 |
| 5,305,203 A | 4/1994 | Raab | 364/413.13 |
| 5,400,244 A | 3/1995 | Watannabe et al. | 364/424.02 |
| 5,402,582 A | 4/1995 | Raab | 33/503 |

FOREIGN PATENT DOCUMENTS

| | | |
|---|---|---|
| EP | 0 355 050 A2 | 8/1988 |
| EP | 0 329 635 A2 | 8/1989 |
| EP | 0 513 417 A1 | 11/1992 |
| FR | 2597969 | 4/1986 |
| FR | 2674017 | 3/1991 |
| GB | 2094590 | 9/1982 |
| GB | 2229296 | 9/1990 |
| JP | 60-31614 | 2/1985 |
| JP | 60-175805 | 9/1985 |
| JP | 60-205721 | 10/1985 |
| JP | 61-175805 | 8/1986 |
| JP | 61240304 | 10/1986 |
| JP | 1-196506 | 8/1989 |
| JP | 4-271408 | 9/1992 |
| JP | 5-197416 | 8/1993 |

OTHER PUBLICATIONS

Translation of DE 41 10741.

McGraw–Hill Encyclopedia of Science & Technology, 1987, pp. 496–500.

Dr. Gerhard Hirzinger, "Sensor Programming —A New Way for Teaching a Robot Paths and Sensory Patterns Simultaneously", NATO ASI Series, Robotics and Artificial Intellignce, 1984 pp. 396–410.

Deneb Brochure, *Deneb's Turkey Approach to Simulation.*

* cited by examiner

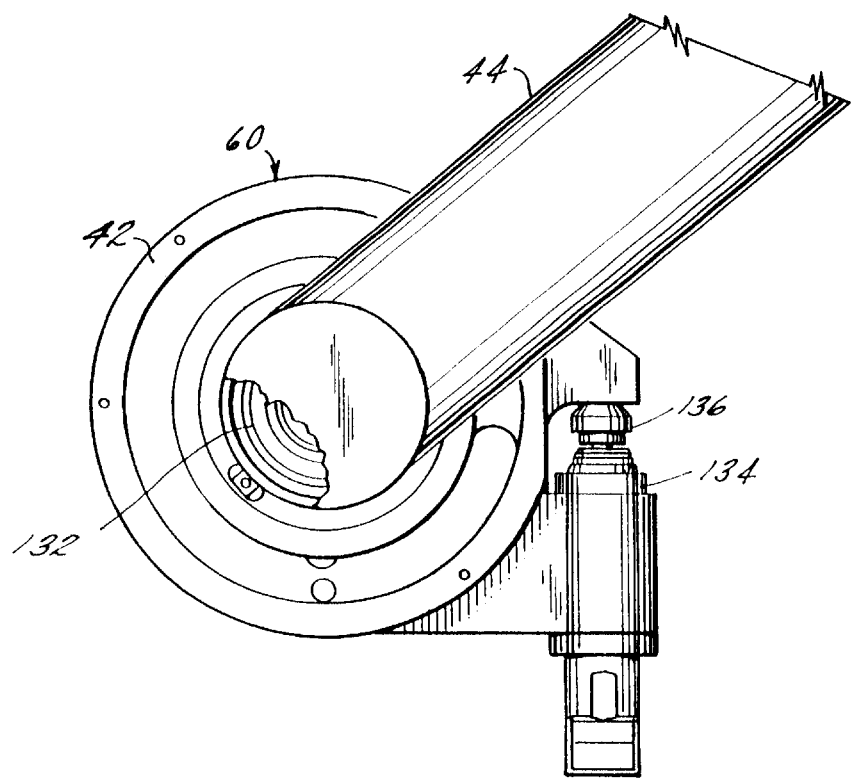
FIG. 8
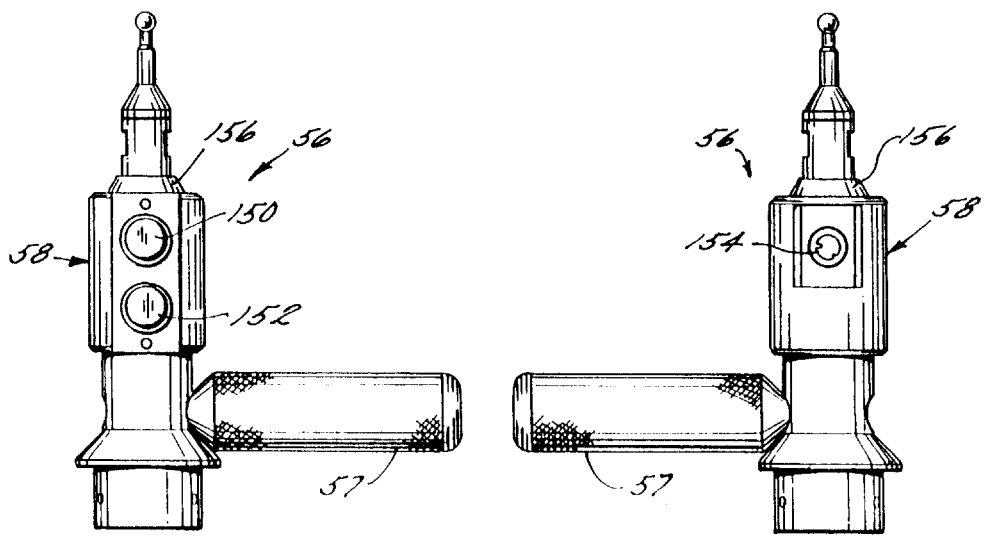
FIG. 9A
FIG. 9B

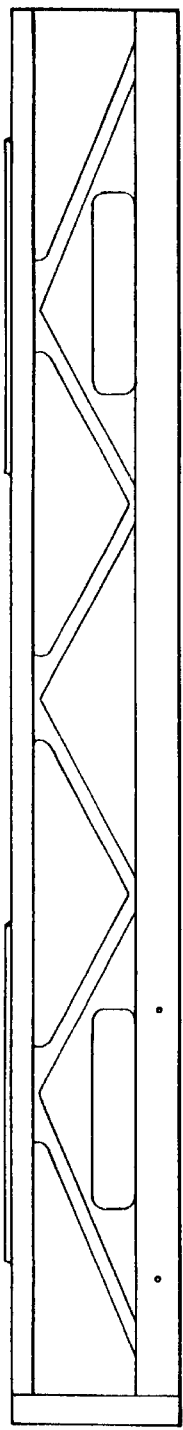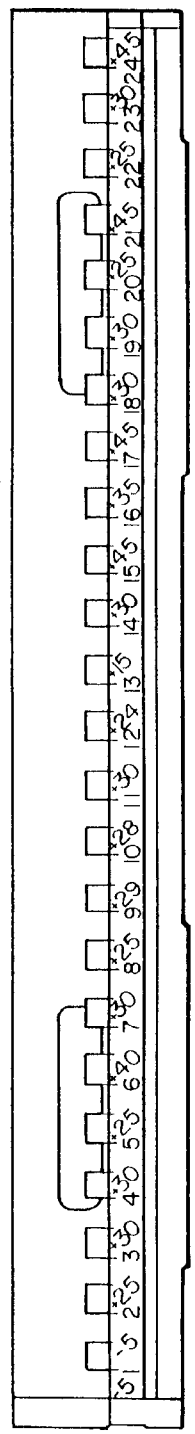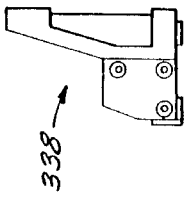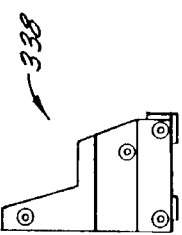

METHOD OF GENERATING AN ERROR MAP FOR CALIBRATION OF A ROBOT OR MULTI-AXIS MACHINING CENTER

CROSS-REFERENCE TO RELATED APPLICATION

This is a continuation-in-part of U.S. application Ser. No. 08/112,394 filed Oct. 26, 1993, which in turn is a continuation-in-part of U.S. application Ser. No. 08/021,949 filed Feb. 23, 1993 (now U.S. Pat. No. 5,402,582).

BACKGROUND OF THE INVENTION

This invention relates generally to three dimensional coordinate measuring machines (or CMM's). More particularly, this invention relates to a new and improved three dimensional CMM which is portable and provides improved accuracy and ease of use; and the application of this CMM to a novel method for programming the tool path of a multi-axis machine tool or robot.

It will be appreciated that everything in the physical world occupies volume or space. Position in a space may be defined by length, width and height which, in engineering terms, is often called an X, Y, Z coordinate. The X, Y, Z numbers represent the dimensions of length, width and height or three dimensions. Three-dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. These devices are typically non-portable, expensive and limited in the size or volume that can be easily measured.

FARO Technologies, Inc. of Lake Mary, Fla. (the assignee of the present invention) has successfully produced a series of electrogoniometer-type digitizing devices for the medical field. In particular, FARO Technologies, Inc. has produced systems for skeletal analysis known as METRECOM® (also known as Faro Arms®) and systems for use in surgical applications known as SURGICOM™. Electrogoniometer-type devices of the type embodied in the METRECOM and SURGICOM systems are disclosed in U.S. Pat. No. 4,670,851 and U.S. application Ser. No. 593,469 filed Oct. 2, 1990 and Ser. No. 562,213 filed Jul. 31, 1990 all of which are assigned to the assignee hereof and incorporated herein by reference.

While well suited for their intended purposes, the METRECOM and SURGICOM electrogoniometer-type digitizing systems are not well suited for general industrial applications where three dimensional measurements of parts and assemblies are often required. Therefore, there is a continuing need for improved, accurate and low cost CMM's for industrial and related applications.

A serious limitation in the practical usage of CNC or computer numerically controlled devices such as robotics and 5-axis machine centers is the time and effort required to program intricate and convoluted paths prior to performing typical robotic functions (such as welding or sanding) and/or typical machine tool functions (such as machining complex molded parts). Presently, this programming process entails a careful and meticulous step-by-step simulation based on trial and error.

SUMMARY OF THE INVENTION

The above-discussed and other problems and deficiencies of the prior art are overcome or alleviated by the three dimensional measuring instrument (e.g., electrogoniometer) of the present invention; and method of using the same. In accordance with the present invention, a novel, portable coordinate measuring machine comprises a multijointed (preferably six joints) manually positionable measuring arm for accurately and easily measuring a volume, which in a preferred embodiment, comprises a sphere preferably ranging from six to eight feet in diameter (but which may also cover diameters more or less than this range) and a measuring accuracy of preferably 2 Sigma +/−0.0005 inch (and optimally 2 Sigma +/−0.001 inch). In addition to the measuring arm, the present invention employs a controller (or serial box) which acts as the electronic interface between the arm and a host computer.

The mechanical measuring arm used in the CMM of this invention is generally comprised of a plurality of transfer housings (with each transfer housing comprising a joint and defining one degree of rotational freedom) and extension members attached to each other with adjacent transfer housings being disposed at right angles to define a movable arm preferably having five or six degrees of freedom. Each transfer housing includes measurement transducers and novel bearing arrangements. These novel bearing arrangements include prestressed bearings formed of counter-positioned conical roller bearings and stiffening thrust bearings for high bending stiffness with low profile structure. In addition, each transfer casing includes visual and audio endstop indicators to protect against mechanical overload due to mechanical stressing.

The movable arm is attached to a base or post which includes (1) a temperature monitoring board for monitoring temperature stability; (2) an encoder mounting plate for universal encoder selection; (3) an EEPROM circuit board containing calibration and identification data so as to avoid unit mixup; and (4) a preamplifier board mounted near the encoder mounting plate for transmission of high amplified signals to a remote counter board in the controller.

As in the prior art METRECOM system, the transfer casings are modular permitting variable assembly configurations and the entire movable arm assembly is constructed of one material for ensuring consistent coefficient of thermal expansion (CTE). Similarly as in the METRECOM system, internal wire routing with rotation stops and wire coiling cavities permit complete enclosure of large numbers of wires. Also consistent with the prior art METRECOM system, this invention includes a spring counterbalanced and shock absorbed support mechanism for user comfort and a two switch (take/accept) data entry device for allowing high precision measurements with manual handling. Also, a generalized option of the type used in the prior art METRECOM system is provided for the measurement of variables in three dimensions (e.g., temperature may be measured in three dimensions using a thermocouple attached to the option port).

The use of a discrete microprocessor-based controller box is an important feature of this invention as it permits preprocessing of specific calculations without host level processing requirements. This is accomplished by mounting an intelligent preprocessor in the controller box which provides programmable adaptability and compatibility with a variety of external hosts (e.g., external computers). The serial box also provides intelligent multi-protocol evaluation and autoswitching by sensing communication requirements from the host. For example, a host computer running software from one manufacturer will generate call requests of one form which are automatically sensed by the controller box. Still other features of the controller box include serial port communications for standardized long distance communications in a variety of industrial environments and novel analog-to-digital/digital counter boards for simultaneous capture of every encoder (located in the transfer housing) resulting in highly accurate measurements.

Efficient on-site calibration of the CMM of the present invention is improved through the use of a reference ball positioned at the base of the CMM to obviate potential mounting complications to system accuracy evaluation. In addition, the CMM of this invention includes means for performing a volumetric accuracy measurement protocol on an interim basis, preferably using a novel cone ballbar device.

In accordance with still another embodiment of this invention, a novel method is provided for programming the complex paths required for operations of robotics and multi-axis machine centers in the performance of typical functions such as sanding or welding (commonly associated with robotics) and machining molded parts (commonly associated with multi-axis machine tools). In accordance with this method, it is desired to replicate in a computer controlled machine, the operation or a path (defined both by direction and orientation) of an experienced human operator. This is accomplished using the CMM of this invention whereby the CMM operator uses the lightweight, easy-to-handle and passive electrogoniometric device described above with a simulated tool at its digitizer end and emulates either a desired tool path or manufacturing operation. As this path or operation is emulated, the position and orientation data (in both the X, Y and Z directions and/or I, J and K orientations) of the CMM is accumulated and stored. This data is then transferred using industry standard formats to a computer numerically controlled (CNC) device such as a robot or machining center for the reproduction of the motions emulated using the CMM. As a result, the computer controlled device has provided to it, in a quick and efficient manner, the exact path and/or operations data for performing a task regardless of the complexity involved. Prior to this method, the programming of such tasks involved meticulously and carefully programmed step-by-step sequences using simulation and trial and error.

To date Robotic programming has operated principally through a process called teach mode. In the teach mode approach the robot is directed to perform and memorize a task. A technician will direct a robot through a controller panel and joy stick to perform the desired motions. The robot's actions are stored as a series of stepwise motions including rotations of various joints and actions of specific end-effectors.

Because of the nature of this method the actual absolute dimensional position was not as important as the ability to repeat a position previously taught.

The industry has witnessed a significant increase in computerization in the design and manufacturing environments and an increase in the number of complex curved paths and types of end-effectors used such as laser. This means that robotic path data begins to resemble, typical CAM (Computer Aided Manufacturing) data. Typical computer controlled machining centers are both dimensionally accurate and repeatable. This is not the case for the typical multi-jointed robot, for the reasons described above.

The above-discussed and other features and advantages of the present invention will be appreciated and understood by those skilled in the art from the following detailed description and drawings.

BRIEF DESCRIPTION OF THE DRAWINGS

Referring to the drawings, wherein like elements are numbered alike in the several FIGURES:

FIG. 8 is an enlarged, side elevation view of a counter-balanced spring device used in the CMM of FIG. 1;

FIGS. 9A and 9B are top and bottom plan views depicting the handle/probe assembly of FIG. 1;

FIGS. 20A–E are respective front, rear, top, right side and left side elevation views of the precision step gauge used in the jig of FIG. 19;

FIG. 27 is a side elevation view depicting the CMM of FIG. 1 being mechanically linked to a robot or the like.

DESCRIPTION OF THE PREFERRED EMBODIMENT

Figure 1:
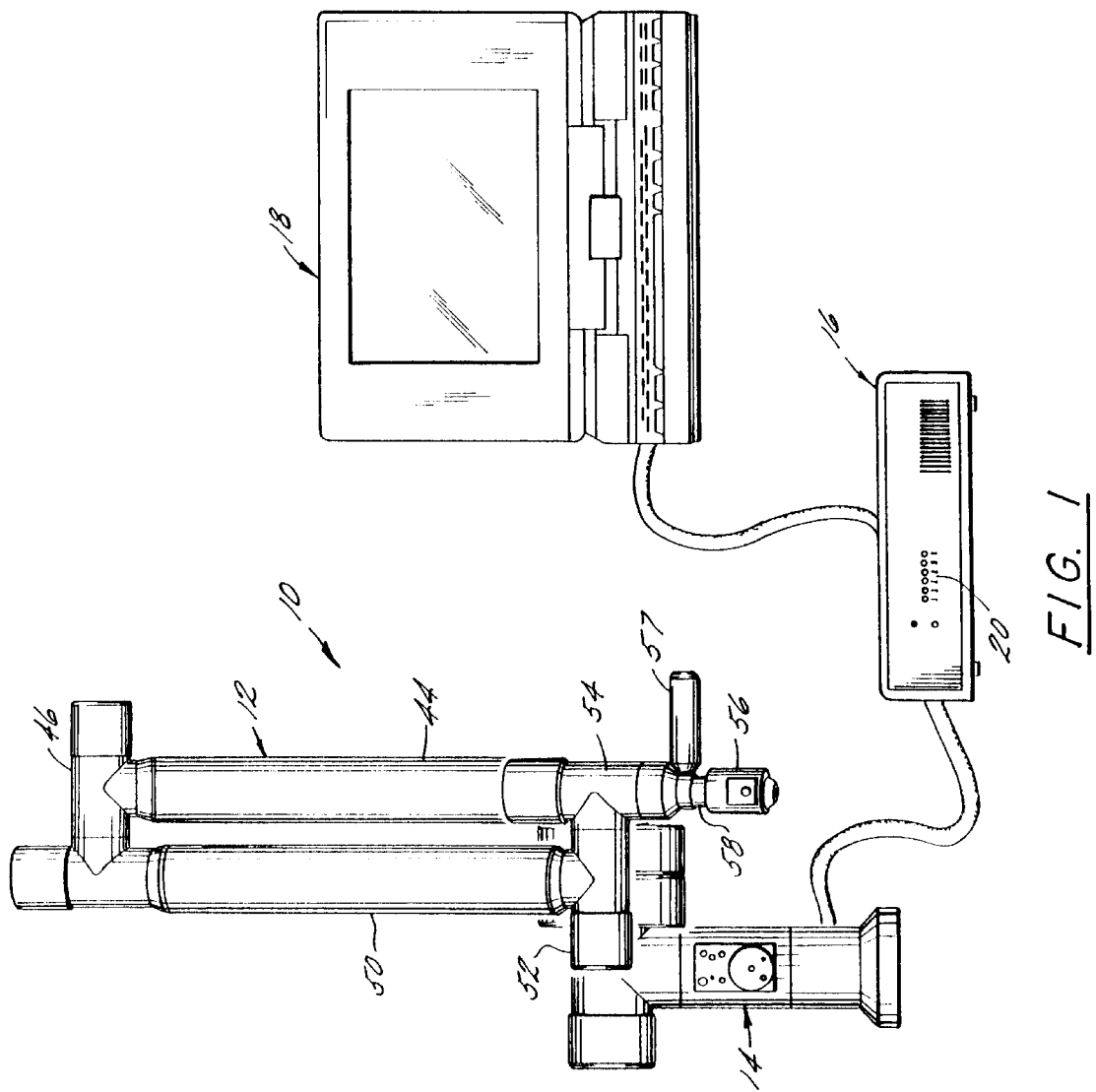
FIG. 1 is a front diagrammatic view depicting the three dimensional measuring system of the present invention including a coordinate measuring machine, a controller box and a host computer.

Referring first to FIG. 1, the three dimensional measuring system of the present invention generally comprises a coordinate measuring machine (CMM) 10 composed of a manually operated multijointed arm 12 and a support base or post 14, a controller or serial box 16 and a host computer 18. It will be appreciated that CMM 10 electronically communicates with serial box 16 which, in turn, electronically communicates with host computer 18.

Figure 2:
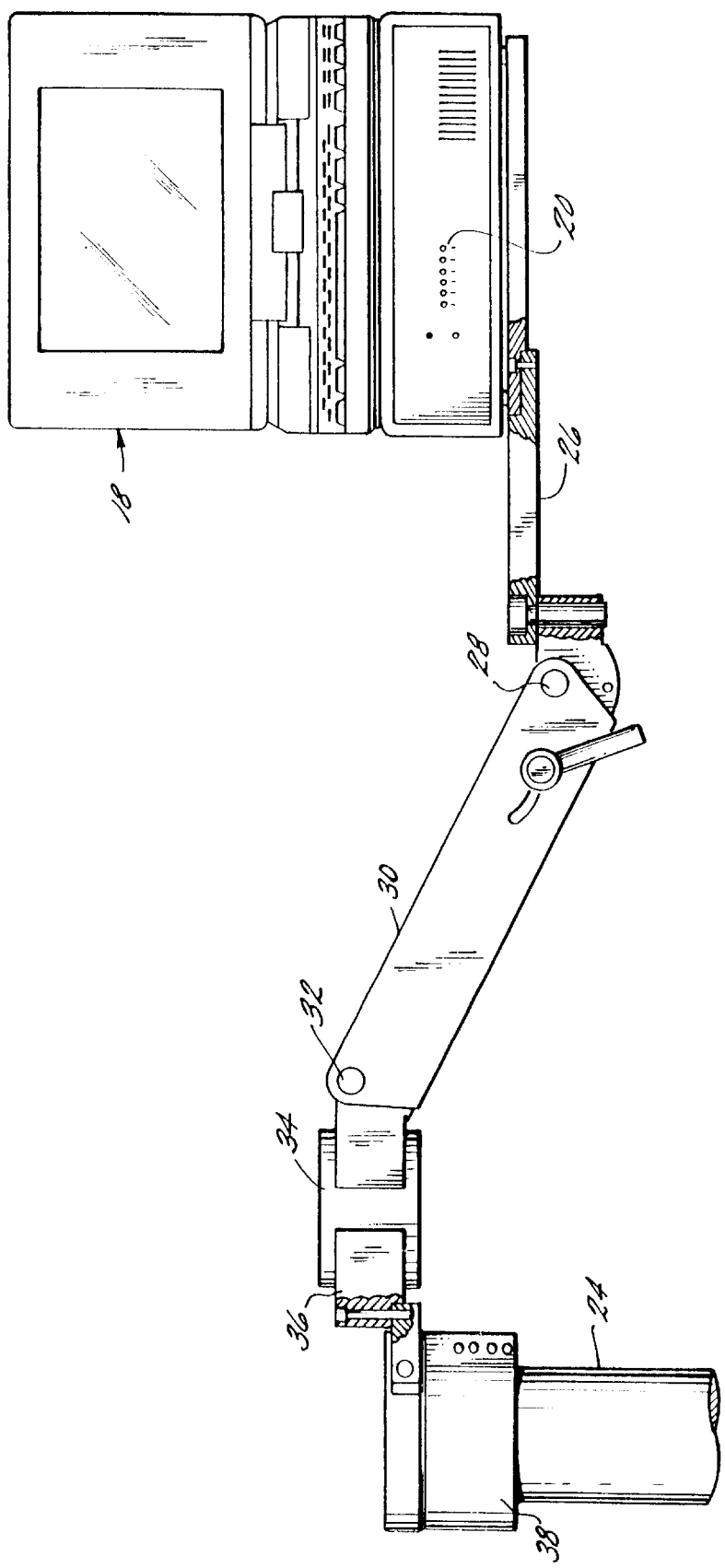
FIG. 2 is a side elevation view depicting the host computer mounted on the serial box, which is in turn, mounted on a maneuverable arm.
Figure 4:
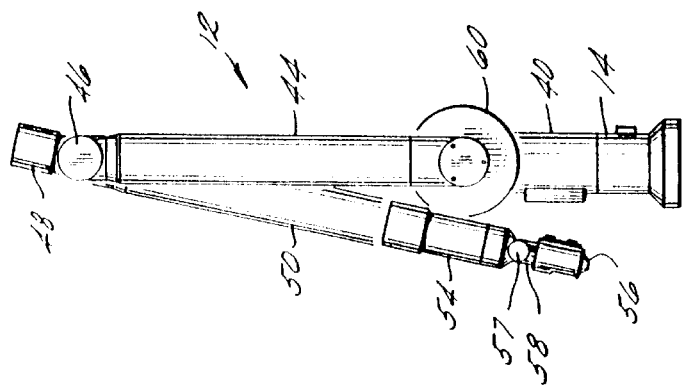
FIG. 4 is a rear elevation view of the CMM shown in FIG. 1.

As will be discussed in more detail hereinafter, CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. As shown in FIG. 2, serial box 16 is intended to be positioned under the host computer 18 (such as the notebook computer shown in FIG. 2) and includes EEPROMS which contain data handling software, a microcomputer processor, a signal processing board and a number of indicator lights 20. As mentioned, basic transducer data is sent from CMM 10 to serial box 16. Serial box 16 then processes the raw transducer data on an ongoing basis and responds to the queries of the host computer with the desired three-dimensional positional or orientational information.

Figure 3:
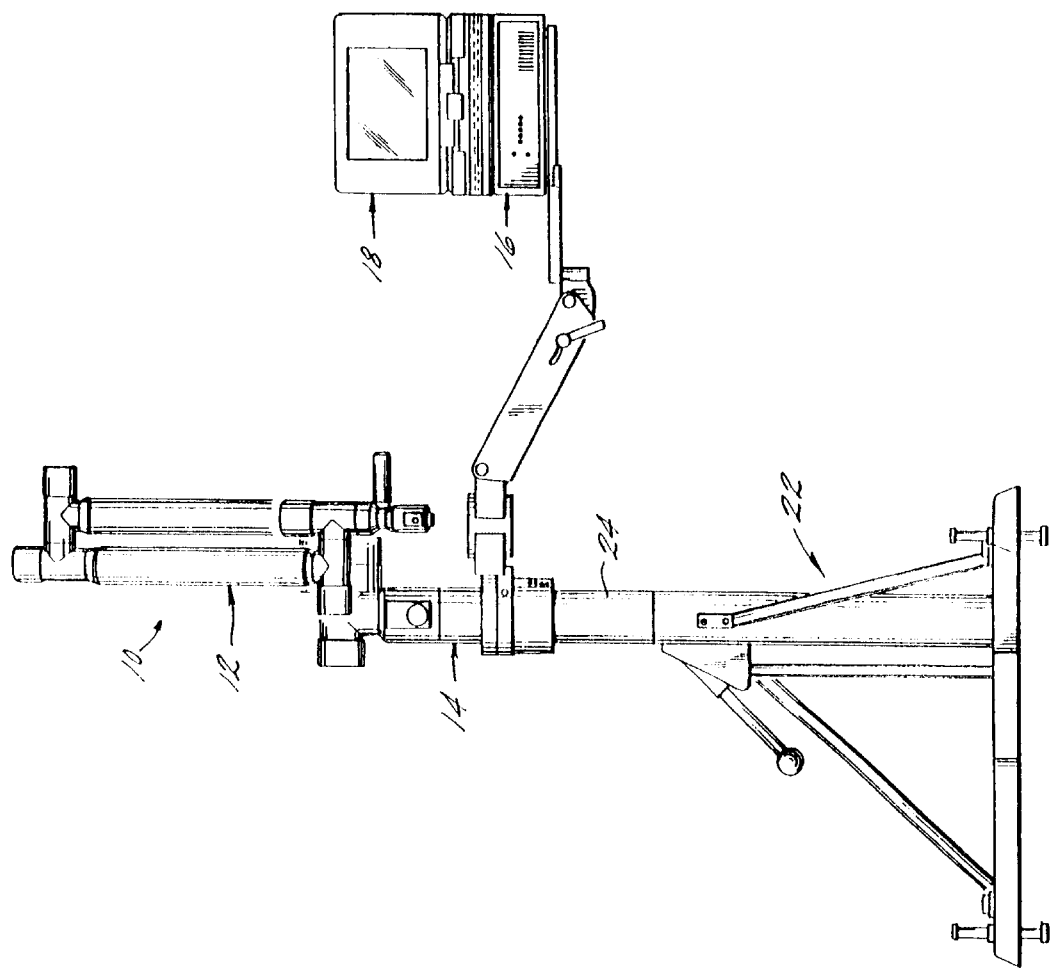
FIG. 3 is a side elevation view of the three dimensional measuring system of the present invention mounted on a theodolite stand.

Preferably, all three components defining the three dimensional measuring system of this invention (e.g., CMM 10, serial box 16 and host computer 18) are mounted on either a fixed mounting surface using a rigid plate and/or a standard optical measurement instrument thread followed by mounting on a known and standard theodolite mobile stand such as shown at 22 in FIG. 3. Preferably, theodolite stand 22 comprises a part no. MWS750 manufactured by Brunson. Such a mobile stand is characterized by a stable rolling platform with an extendable vertical tower and with common attachments and locking mechanisms. As shown in FIGS. 2 and 3, support base 14 of CMM 10 is threaded or otherwise attached onto a vertical support member 24 of stand 22 while serial box 16/host 18 is supported on a shelf 26 pivotally connected at a first joint 28 to an arm 30 which is pivotally connected to a second joint 32. Connecting member 34 interconnects joint 32 to a swivel connection 36 attached to a cap 38 mounted over the top of member 24.

Figure 5:
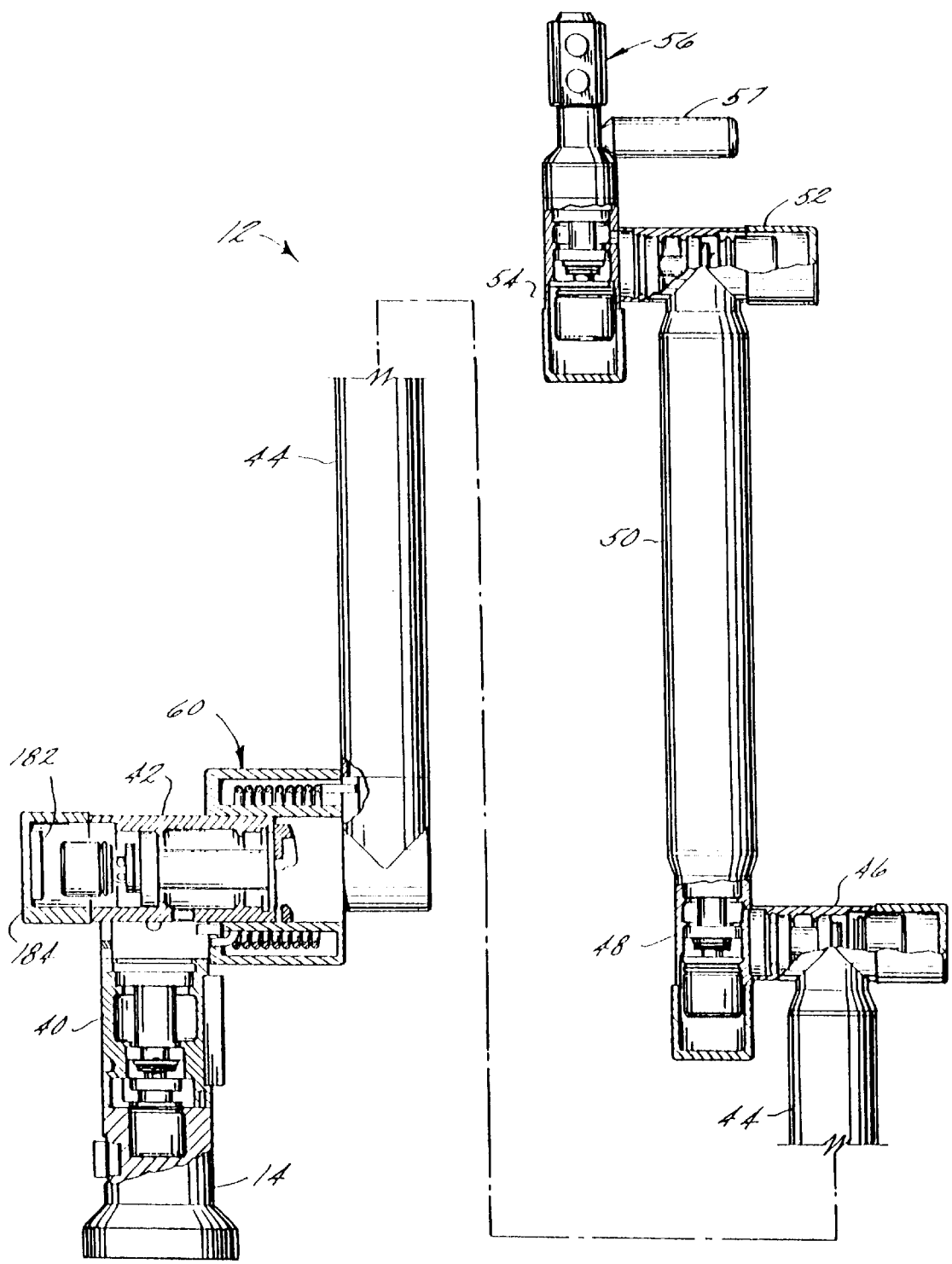
FIG. 5 is a longitudinal view, partly in cross-section of the CMM of FIG. 1.

Referring now to FIGS. 1 and 4–9, CMM 10 will now be described in detail. As best shown in FIG. 5, CMM 10 comprises a base 14 connected to a first set of two transfer housings including a first transfer housing 40 which, in turn, is connected to a second transfer housing 42 (positioned transverse to housing 40). A first extension member 44 is rigidly attached to a second set of two transfer housings including a third transfer housing 46 transversely attached to a fourth transfer housing 48. First extension member 44 is positioned perpendicularly between transfer housings 42 and 46. A second extension member 50 is aligned with an rigidly attached to transfer housing 48. Rigid extension member 50 is rigidly attached to a third set of two transfer housings including a fifth transfer housing 52 transversely attached to a sixth transfer housing 54. Fifth transfer housing 54 has attached thereto a handle/probe assembly 56.

Figure 6:
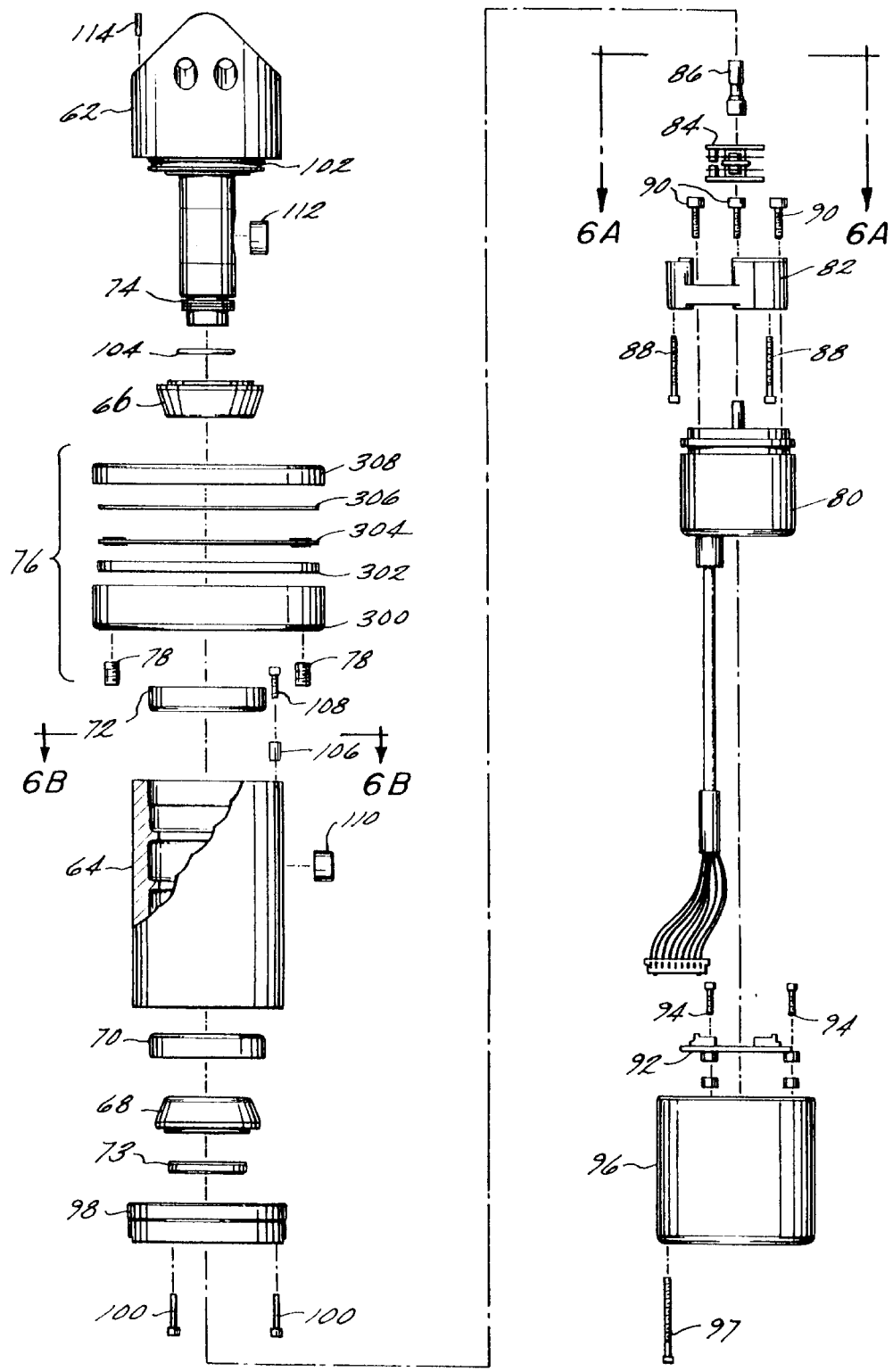
FIG. 6 is an exploded, side elevation view of a transfer housing used in the CMM of FIG. 1.

In general (and as will be discussed in more detail hereinafter), position sensing transducers are mounted in each of the six transfer housings 40, 42, 46, 48, 52 and 54. Each housing is comprised of bearing supports and transducer compartments which are made to then cylindrically attach to each other using 45° angled attachment screws (FIG. 6). At the base 14 is a counterbalanced spring device 60 for support of arm 12 in its standard vertical configuration (FIG. 8).

Figure 7:
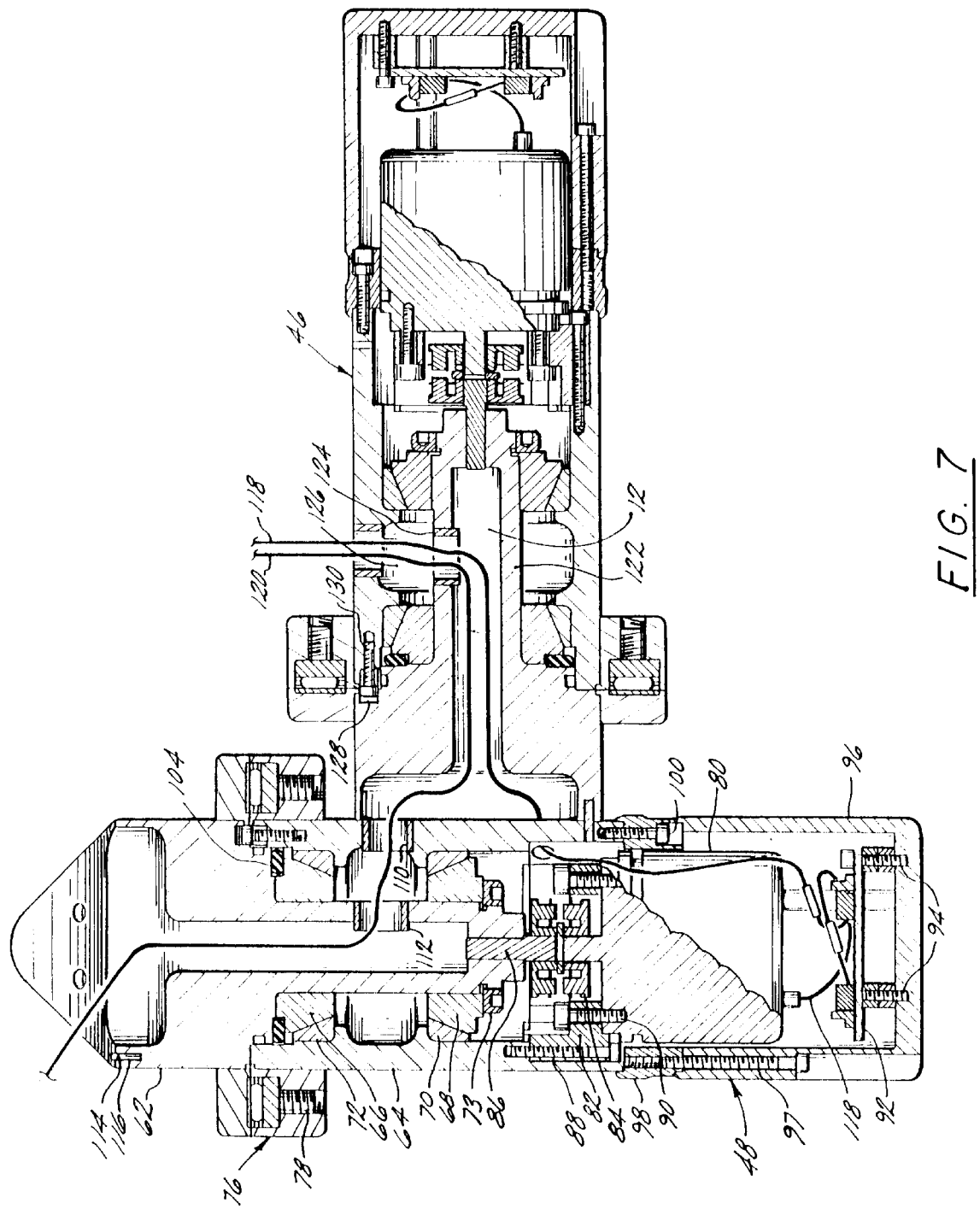
FIG. 7 is a cross-sectional elevation view of two assembled, transversely orientated transfer housings.

Turning now to FIGS. 6 and 7, a detailed description will be made of a transfer housing and its internal components. It will be appreciated that FIG. 6 is an exploded view of a transfer housing, while FIG. 7 shows an enlarged view of the transversely oriented and attached transfer housings (e.g., housings 46 and 48). Each housing includes an internal carrier 62 and an external casing 64. Mechanical stability between internal carrier 62 and external casing 64 is provided by two counter-positioned (e.g., oppositely disposed) conical roller bearings 60, 68 positioned to compress against their respective conical races, 70, 72. Conical races 70 and 72 are permanently affixed into the external transfer casing 64. Carrier includes a shaft 122 extending therefrom and terminating at threading 74. Conical bearings 60, 68 are preferably made from hardened steel while races 70, 72 are also made from hardened steel.

Figure 6A:
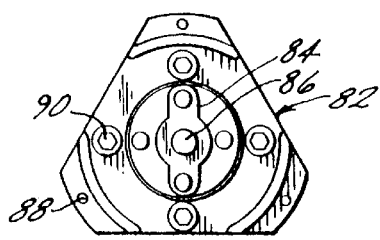
FIGS. 6A and 6B are views along the lines 6A—6A and 6B—6B, respectively, of FIG. 6.

During assembly of transfer casing 48, a compressional force is applied using a nut 73, which is tightened to a specific torque on threads 74, providing a prestressed bearing situation resulting in no motion other than axial rotation under typically applied loads. Because of the necessity of a low profile of such an arm during manual handling and the attendant reduction in the overall stiffness, it is preferable and, in fact required in certain applications, to also install a thrust bearing 76 at the interface between carrier 62 and casing 64. Thrust bearing 76 provides further mechanical stiffening between carrier 62 and casing 64 of the transfer housing. Thrust bearing 76 comprises five elements including thrust adjustment ring 300, flat annular race 302, roller bearing and cage 304, annular race 306 and opposing thrust cover 308. Thrust bearing 76 is adjusted through a series of set screws 78 and provides for high bending stiffness. The transducer, (preferably an encoder 80 such as is available from Heidenhain under the designation Mini-Rod, part no. 450M-03600), is mounted to a universal mounting plate 82 for mounting into the transfer casing. Universal mounting plate 82 is important in satisfying possible component availability problems such that a change in manufacture of transducer 80 and, hence, the change in mounting screw configuration can be accommodated through modifications in the mounting plate 82. Mounting plate 82 is shown in FIG. 6A as a triangular shaped plate having rounded corners. FIG. 6A also depicts threaded members 88 and 90, a pin 86 and a coupler 84 (all of which are discussed. hereinafter).

Figure 6B:
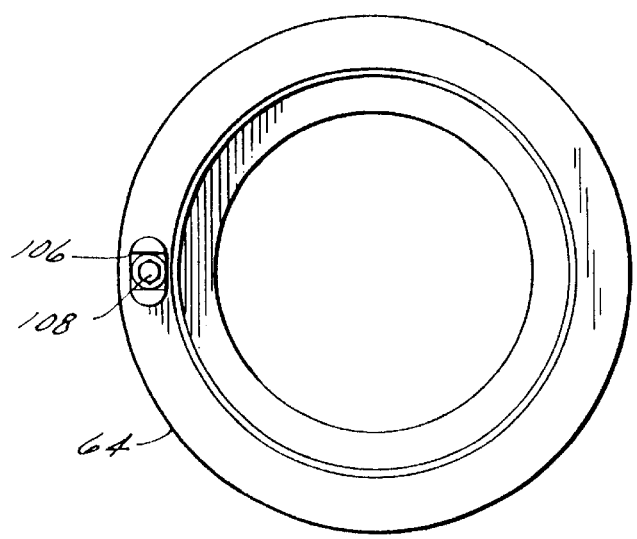

High accuracy rotational measurements using encoders 80 require that there should be no loads applied to the encoders and that motion of the transfer casing be accurately transmitted to the encoder despite small misalignments of the axis of the transfer casing and axis of the encoder. The angular transfer errors are well known to those skilled in the art from the published encoder literature. Communicating with encoder 80 is a coupler 84 such as is available from Rembrandt under the designation B1004R51R. An extension shaft 86 is utilized for ultimately connecting encoder 80 to the transfer casing 64. Shaft 86 is attached both to coupler 84 and to the end of carrier 62 at threading 74 using set screws 88, 90 (see FIG. 7). In accordance with an important feature of this invention, an electronic preamplifier board 92 is positioned in close proximity to encoder 80 and is mounted (via screws 94) on the inside of cap cover 96. Cap cover 96 is attached to casing 64 via screw 97. A transition housing 98 interconnects cap cover 96 to casing 64 via screw 97 and screws 100. Sealing of the transfer housing to the environment is accomplished at the joint using an O-ring groove 102 in which is mounted a standard rubber O-ring groove 104. A rotational endstop 106 (to be discussed hereinafter), is best shown in FIG. 6B and comprises a square shaped metal housing having an opening therethrough which is mounted onto casing 64 using bolt 108 threaded through the opening of the housing. Wire passing through grommets to stop abrasion over long term use are mounted on both carrier 62 and casing 64 at 110 and 112. A location pin 114 is received by a complimentary shaped recess 116 in carrier 62 for the purpose of maintaining relative orientation of two adjacent transfer casings.

Referring to FIG. 7, for environmental and other reasons, it is important that all wire be completely hidden from sight and, therefore, contained within the arm 12. FIG. 7 depicts two assembled transfer housings 46, 48 mounted perpendicularly to each other and demonstrating the passage of wires. It will be appreciated that during use of CMM 10, the encoder information from encoder 80 is passed to its processor board 92 through wire 118 which is then amplified and passed through the arm by machined passageways 120. Wire 118 then passes through a channel 120 in the shaft 122 of the internal carrier 62 of the transfer casing 46 and through a grommetted hole 124 at which time it passes into a large cavity 126 machined on the external casing 64 of transfer housing 46. Cavity 126 permits the coiling of the wire strands during rotation of the transfer casing and is configured so as not to produce any wire abrasion and a minimum of wire bending. However, because the wire limits the overall ability to fully rotate, an incomplete spherical groove 128 is created in which is positioned an endstop screw, 130 which limits the full rotation, in this case to 330°. It will be appreciated that the pass through channel 120 and wire coiling cavities 122 are subsequently repeated in each transfer casing allowing the wires to progressively make their way down to the connector mounted at the base 14, resulting in no exposed wiring.

Figure 16:
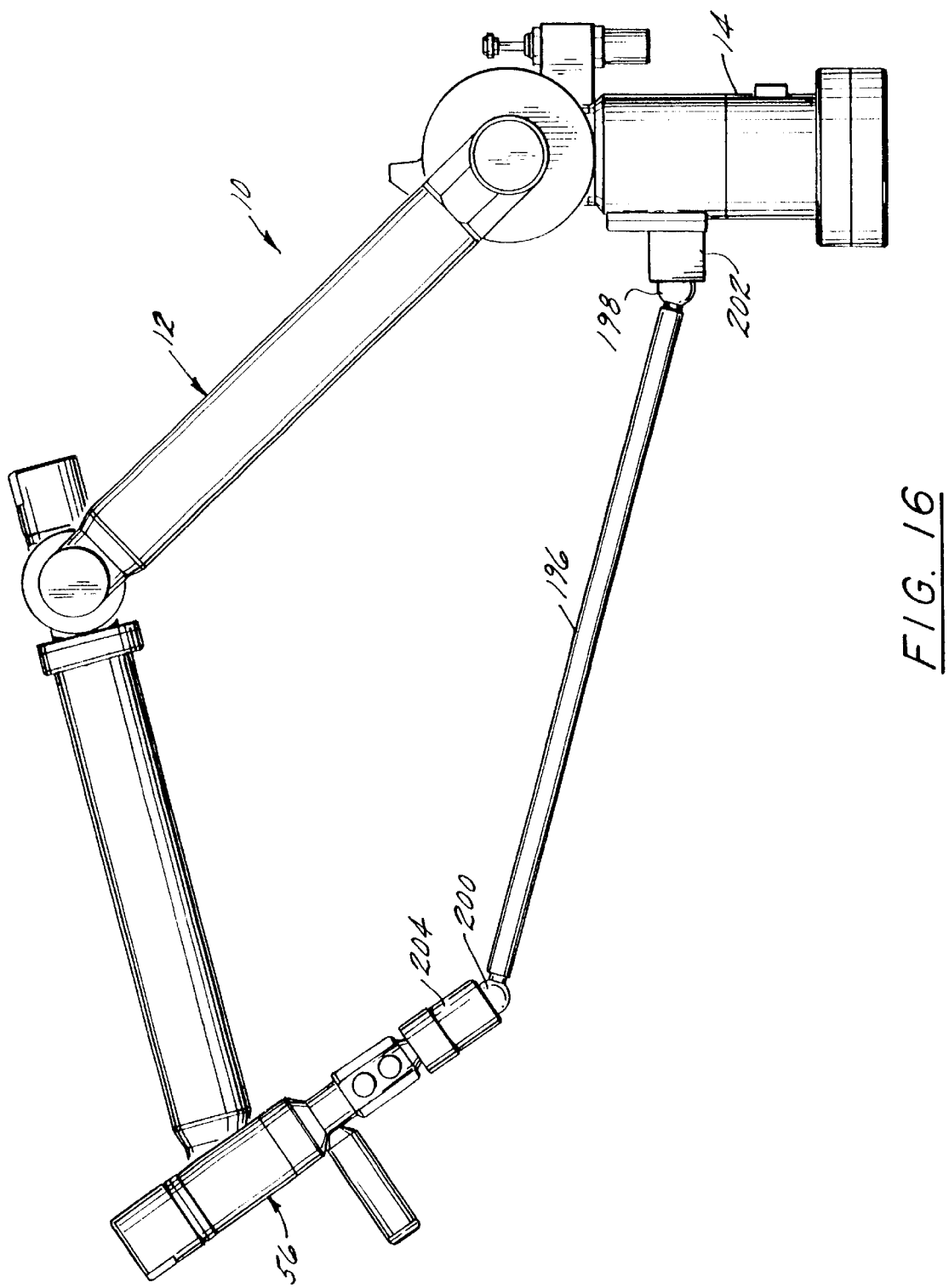
FIG. 16 is a side elevation view of the CMM of FIG. 1 being calibrated with a ballbar.
Figure 17:
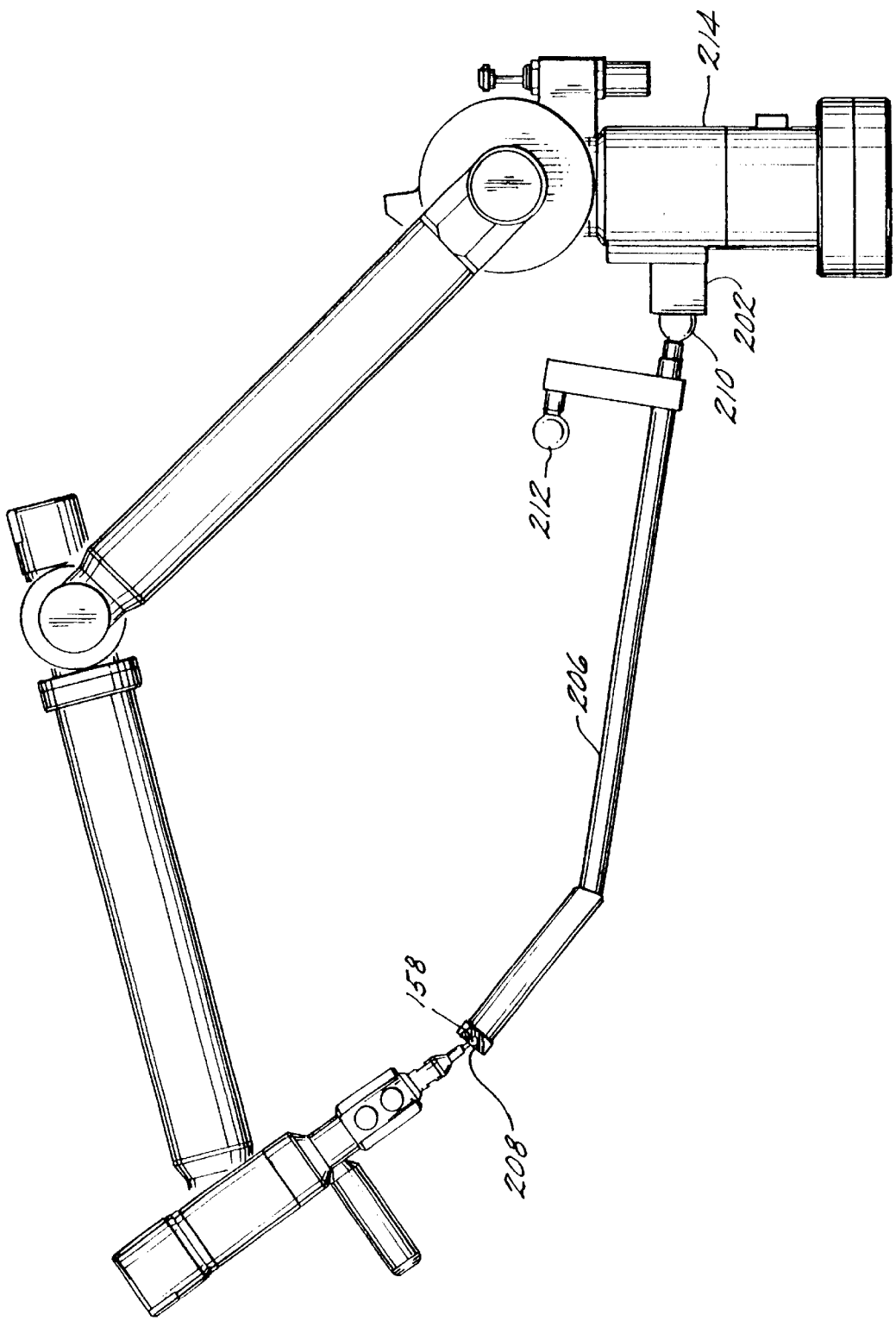
FIGS. 17 and 18 are side elevation views of the CMM of FIG. 1 being calibrated by a novel cone ballbar device.
Figure 18:
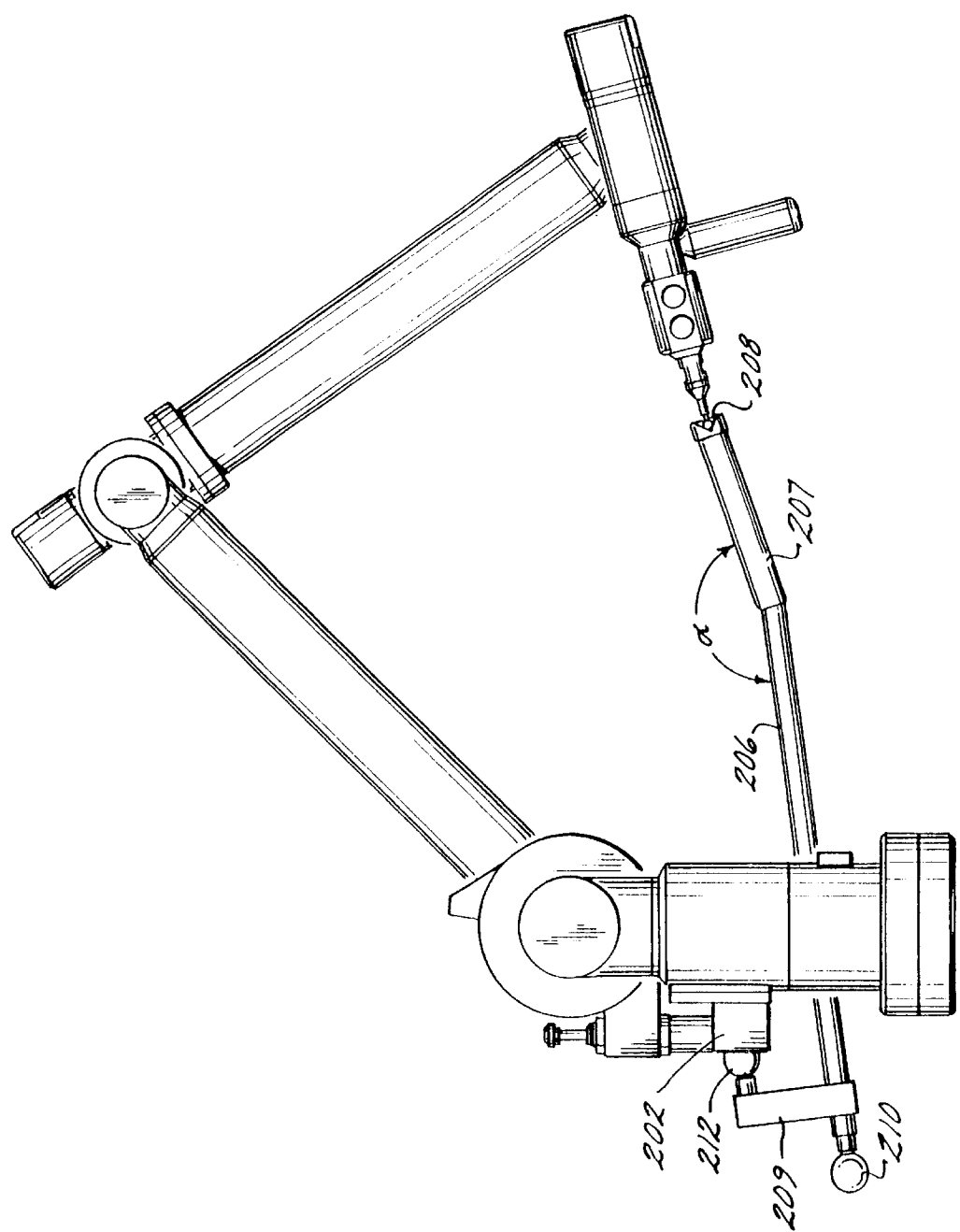

Turning now to FIG. 8, the construction of the aluminum arm as well as the various bearings and transducers results in an accumulated weight of approximately 10 to 15 pounds at the probe handle assembly 56 of CMM 10. Under normal circumstances, this would create a significant amount of fatigue during use and, hence, must be counterbalanced. Weight counterbalances are not preferred since they would significantly increase the overall weight of the device when being considered for transportability. Therefore, in a preferred embodiment counterbalancing is performed using counterbalance device 60 which comprises a torsional spring 132 housed in a plastic casing 134 and mounted at transfer housing 42 at base 14 for providing a lift for arm 12. Coiled torsional spring 132 can be mounted in a variety of positions affecting the overall pretension and, hence, may be usable on a variety of lengths and weights of arms 12. Similarly, due to the weight of arm 12 and the effect of the recoiled spring, significant shock loads may occur when repositioning the arm to the storage position. To prevent significant shocking of the arm upon retraction, air piston shock absorber 134 is also configured into plastic housing 142 of counterbalance spring device 60. This results in an absorption of the shock load and slow relaxation into the rest position. It will be appreciated that FIG. 8 depicts the shock absorber 134 in a depressed configuration while FIGS. 16–18 depict shock absorber 134 in a fully extended position.

In FIGS. 9A and 9B, top and bottom views of probe handle assembly 56 are shown. Probe handle assembly 56 is meant to be held as either a pencil or pistol grip and possesses two switches (items 150 and 152 in FIG. 9A) for data taking, a connector (item 154 in FIG. 9B) for the attachment of optional electronics and a threaded mount 156 for receiving a variety of probes. Because the CMM 19 is a manual measurement device, the user must be capable of taking a measurement and then confirming to CMM 10 whether the measurement is acceptable or not. This is accomplished through the use of the two switches 150, 152. The front switch 150 is used to trap the 3-dimensional data information and the back switch 152 confirms its acceptance and transmits it to the host computer 18. On the back of the switch enclosure 158 (housing 150, 152) is connector 154 which possesses a number of voltage lines and analog-to-digital converter lines for general attachment to a number of options such as a laser scanning device or touch probe.

Figures 10A, 10B:
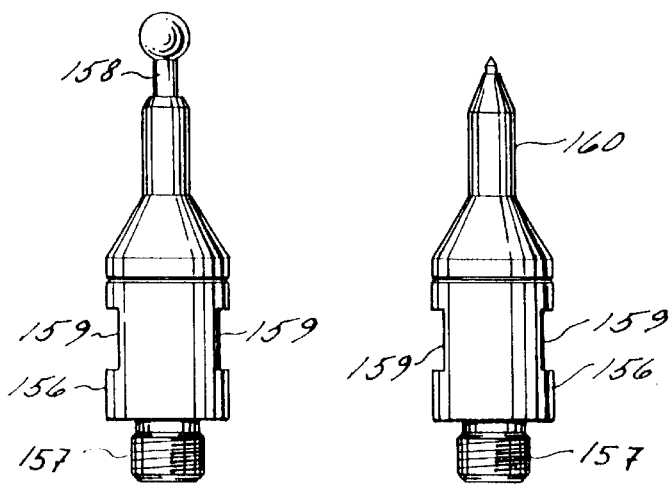
FIGS. 10A and 10B are respective side elevation views of a ball probe and a point probe.

A variety of probes may be threaded to handle assembly 56. In FIG. 10A, hard ¼ inch diameter ball probe 158 is shown while in FIG. 10B, a point probe 160 is shown. Both probes 158, 160 are threadably mounted to mount 156 (using male threaded member 157), which in turn, is threadably mounted to probe housing 58. Mount 156 also includes a plurality of flat surfaces 159 for facilitating engagement and disengagement of the probes using a wrench.

Figure 11:
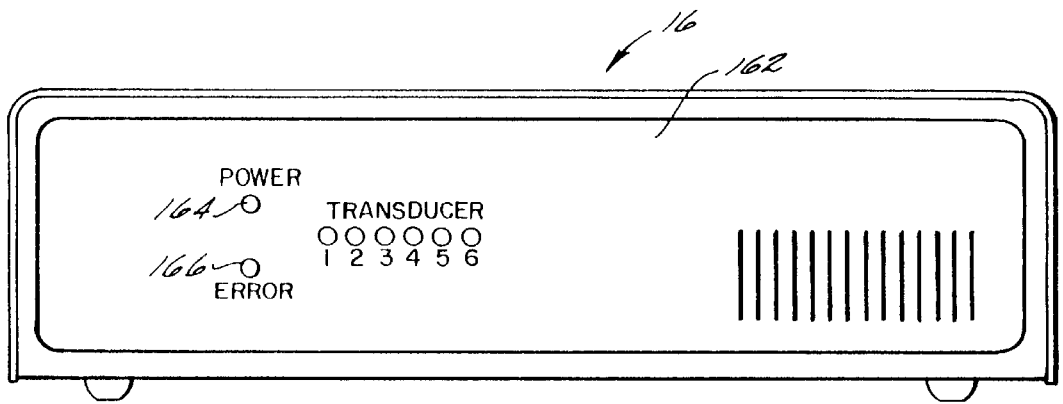
FIG. 11 is an enlarged front view of the controller box of FIG. 1.
Figure 12:
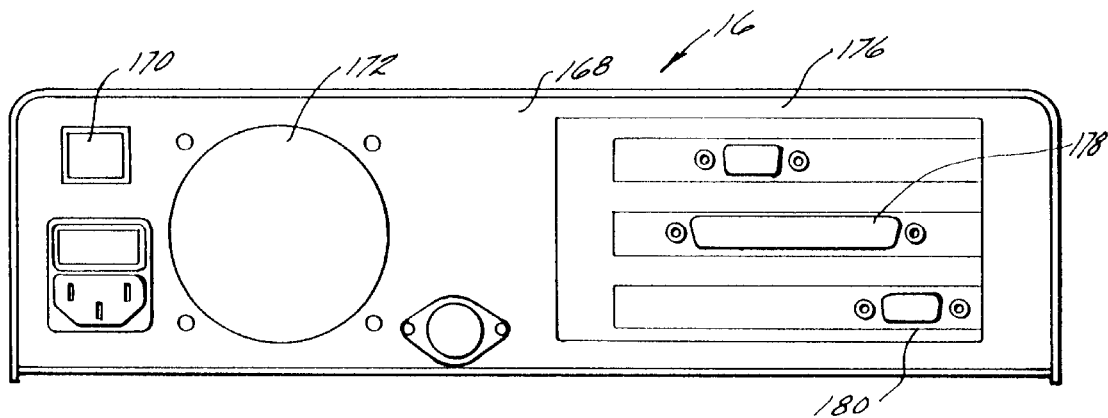
FIG. 12 is an enlarged rear view of the controller box of FIG. 1.

Turning now to FIGS. 11 and 12, a description of the controller or serial box 16 now follows. FIG. 11 shows the front panel face 162 of the controller or serial box 16. Front panel 162 has eight lights including power indicator light 164, error condition light 166, and six lights 20, one for each of the six transducers (identified as items 1–6) located in each transfer housing. Upon powering up, power light 164 will indicate power to the arm 12. At that time, all six transducer lights will indicate the status of each of the six transducers. In a preferred embodiment of this invention, the transducers are incremental digital optical encoders 80 and require referencing. (In a less preferred embodiment, the transducers may be analog devices). Hence, upon start up, each of the six joints (e.g., transfer housings) must be rotated to find the reference position at which time the six lights shall turn off.

In accordance with an important feature of the present invention, during usage, should any of the transducers approach its rotational endstop 106 from within 2 degrees, a light and an audible beep for that particular transducer indicates to the user that the user is too close to the end stop; and that the orientation of the arm should be readjusted for the current measurement. The serial box 16 will continue to measure but will not permit the trapping of the data until such endstop condition is removed. A typical situation where this endstop feature is necessary is the loss of a degree of freedom by the rotation of a particular transducer to its endstop limit and, hence, the applications of forces on the arm causing unmeasured deflections and inaccuracies in the measurement.

At any time during the measurement process, a variety of communication and calculation errors may occur. These are communicated to the user by a flashing of the error light and then a combination of lights of the six transducers indicating by code the particular error condition. It will be appreciated that front panel 162 may alternatively utilize an alphanumeric LCD panel giving alphanumeric error and endstop warnings.

Turning to FIG. 12, the rear panel 168 of serial box 16 includes a variety of standard PC connectors and switches including a reset button 170 which resets the microprocessor; an AC input fan 172 for air circulation; a connector 174 for a standard PC AT keyboard, connector 176 for an optional VGA board for monitoring of the internal operations of serial box 16, connector 178 for receiving the variety of signal lines for the CMM data, and connector 180 for the standard RS232 connector for the host 18.

Serial box 16 is responsible for monitoring the temperature of the CMM and in real time modifying the kinematics or mathematics describing its motion according to formulas describing the expansion and contraction of the various components due to changes in temperature. For this purpose, and in accordance with an important feature of this invention, a temperature monitoring board 182 (which includes a temperature transducer) is positioned at the location of the second joint 42 on the interior of a cover 184 (see FIGS. 4 and 5). CMM 10 is preferably constructed of aircraft grade aluminum externally and anodized. Preferably, the entire arm 12 is constructed of the same material except for the mounting screws which are stainless steel. The same material is used throughout in order to make uniform the expansion and contraction characteristics of arm 12 and make it more amenable to electronic compensation. More importantly, the extreme degree of stability required between all parts through the large temperature range requires that there be no differential thermal expansion between the parts. As mentioned, the temperature transducer 182 is preferably located at transfer housing 42 because it is believed that this location defines the area of highest mass and is therefore the last area to be stabilized after a large temperature fluctuation.

Figure 13:
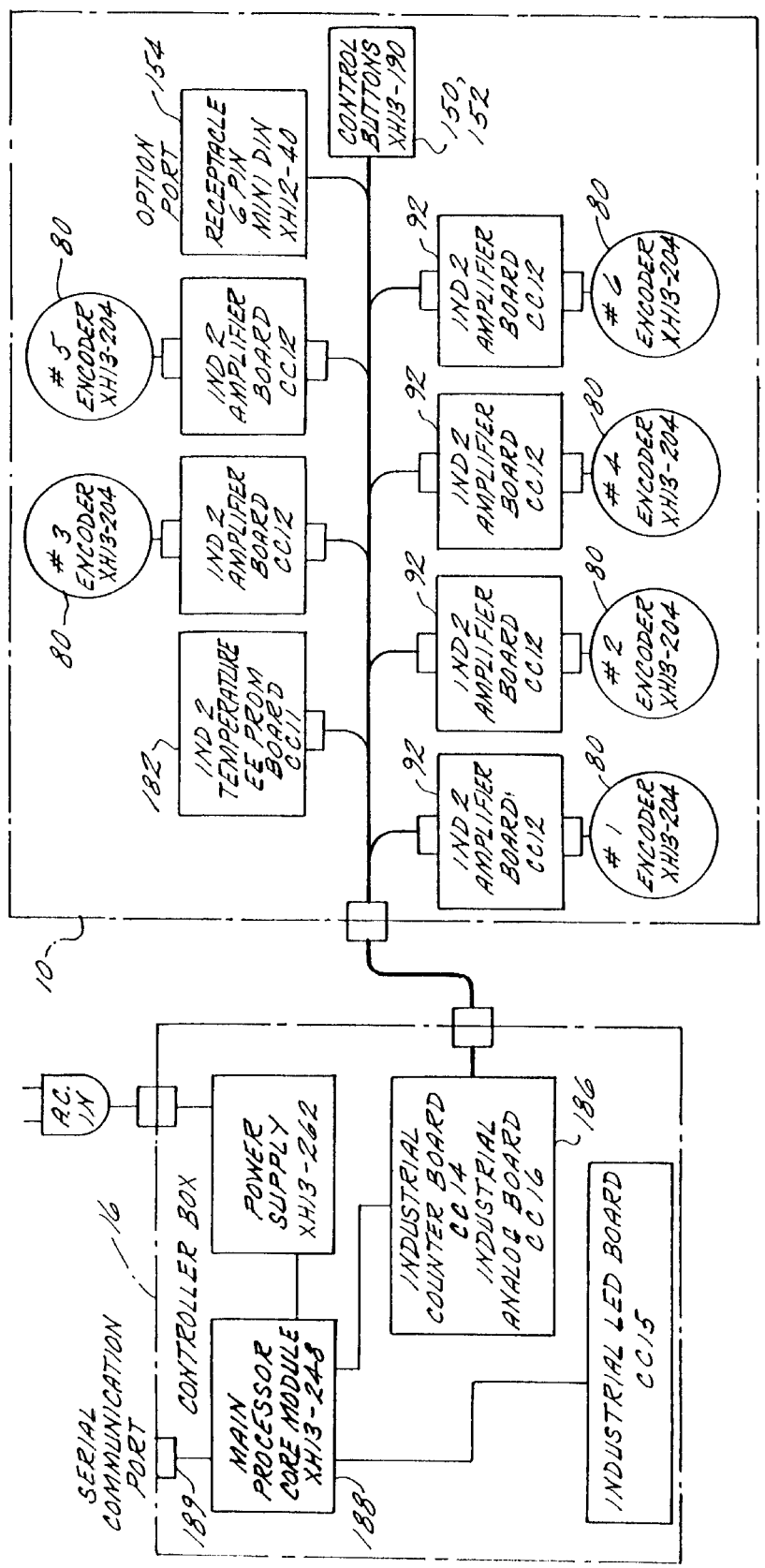
FIG. 13 is a schematic view of the electronic components for the three dimensional measuring system of FIG. 1.

Referring now to FIG. 13, the overall electronic schematic layout for CMM 10 and serial box 16 is shown. Six encoders 80 are shown with each encoder having an amplifier board 92 located in close proximity to it for the minimization of noise on signal transfer. An option port 154 is shown which is a six pin connector available at the handle 56 for the attachment of a variety of options. Two control buttons 150 and 152 for indicating to serial box 16 the measurement process, are also shown.

The temperature transducer is associated with a temperature circuit board 182 which is also located in arm 12 as shown in FIG. 13. In accordance with still another important feature of this invention, the temperature board 182 comprises an EEPROM board. The EEPROM is a small computerized memory device (electrically erasable programmable read only memory) and is used to contain a variety of specific calibration and serial number data on the arm (see discussion regarding FIGS. 19–21). This is a very important feature of this invention which permits high quality control of CMM 10 and importantly, precludes the inadvertent mixup of software and arms. This also means that the CMM arm 12 is a stand alone device not requiring specific calibration data to reside in controller box 16 which may need to be separately serviced and/or switched with other machines.

The electronic and pulse data from the arm electronics is then transmitted to a combined analog-to-digital converter/digital counting board 186 which is a paired set comprising a 12 bit analog to digital converter and a multi channel 16 bit digital counter. Board 186 is positioned on the standard buss of the controller box. The counting information is processed using the core module 188 (comprising a commercially available Intel 286 microprocessor such as a part number CMX-286-Q51 available from Ampro) and programs stored on an EEPROM also residing in the controller box. Subsequent data is then transmitted through the serial communication port 189.

The microprocessor-based serial box 16 permits preprocessing of calculations specific to CMM 10 without host level processing requirements. Typical examples of such preprocessor calculations include coordinate system transformations; conversion of units; leap-frogging from one coordinate system to another by using an intermediary jig; performance of certain certification procedures, including calculations of distance between 2 balls (such as in ANSI B89 ballbar); and outputting data in specific formats required for downloading to a variety of hosts and user programs.

The serial box is configured to communicate with a variety of host formats including PC, MSDOS, Windows, Unix, Apple; VME and others. Thus, the serial box processes the raw transducer data on an ongoing basis and responds to the information requests or polling of the host computer with the desired three dimensional positional or orientational information. The language of the serial box is in such a form that drivers or computer communication subroutines in microprocessor 188 are written in the language of the host computer so as to drive the serial port and communicate with CMM 10. This function is designated the "intelligent multi-protocol emulation and autos witching" function and works as follows: A variety of host programs may be installed on the host computer. These host programs will poll the serial port with a variety of requests to which the serial box must respond. A number of protocols have been preprogrammed into the serial box to responds to polls or inquiries on the serial port for a variety of different, popular softwares. A polling request by a software requires a specific response. The serial box will receive the polling request, establish which protocol it belongs to, and respond in the appropriate manner. This allows transparent communication between CMM 10 and a wide variety of application software such as computer aided design and quality control softwares, e.g., AutoCad® from Autodesk, Inc., CADKEY® from Cadkey, Inc., and other CAD programs; as well as quality control programs such as GEOMET® from Geomet Systems, Inc. and Micromeasure III from Brown and Sharpe, Inc.

The three dimensional CMM of the present invention operates as follows. Upon power up, the microprocessor 188 in the serial box 16 undergoes start up self-checking procedures and suppplies power through the instrument port to arm 12 of CMM 10. The microprocessor and software residing on EEPROM 182 determines that upon initial power up none of the encoders 80 have been initialized. Hence, the microprocessor 188 sends a signal to the display board lighting all the lights 20, indicating a need to be referenced. The user will then mechanically move the arm which will cause the transducers to individually scan their range, at which time a reference mark is passed. When the reference mark is passed, the digital counter board 186 responds by trapping its location and identifying to the front display board 20 that the transducer has been referenced and the light is extinguished. Once all transducers have been referenced, the system establishes serial communication with the host and waits for further instruction. Pressing of the front or back button of handle 56 will initiate a measurement process. Pressing the front button 150 will trap the current transducer readings. Pressing the back button 152 will indicate to the microprocessor that these values are to be translated into dimensional coordinates and issued through the serial port to the host 18. The host 18 and the serial box 16 will then continue to react to each other's serial line requests.

Figure 19:
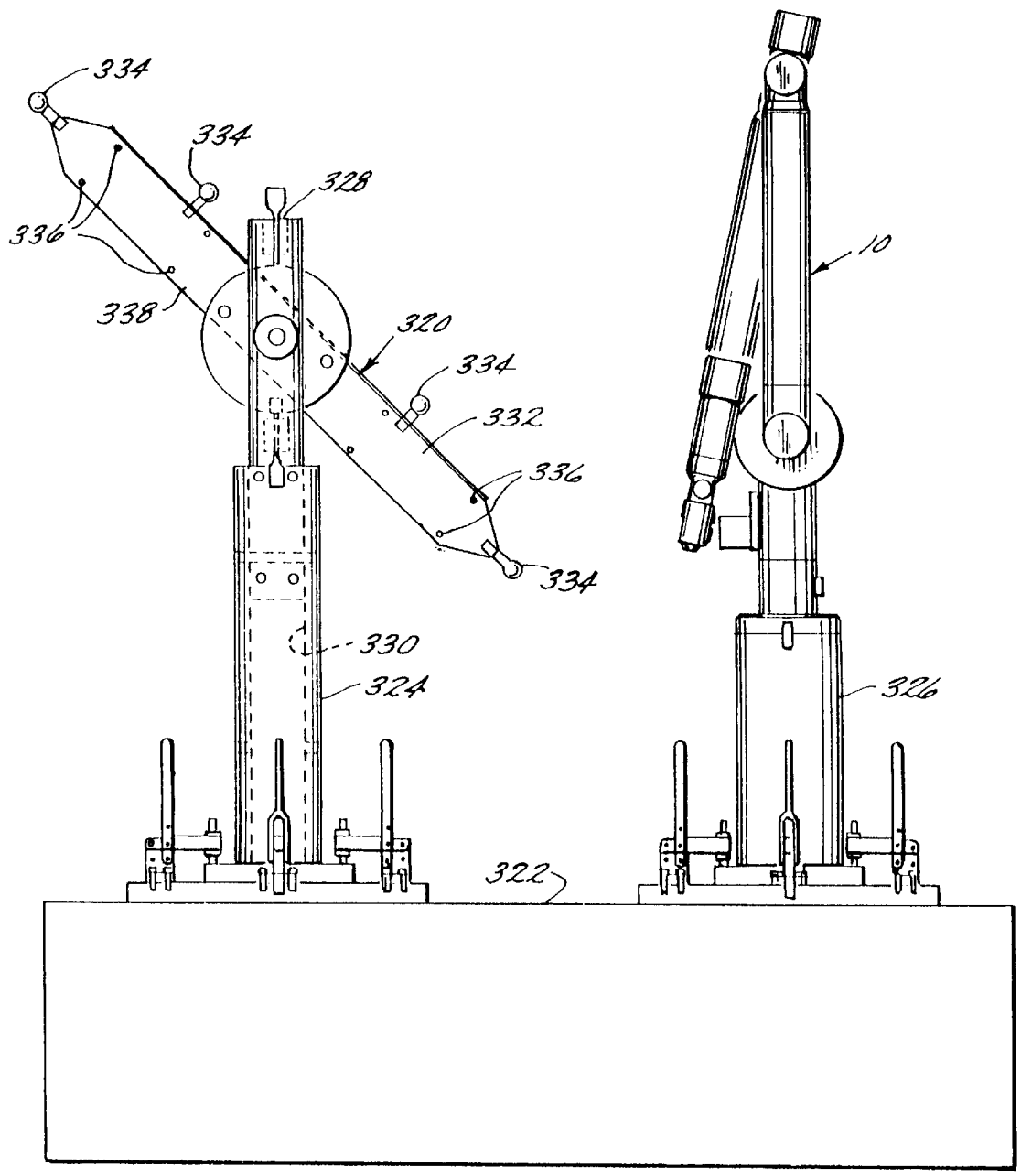
FIG. 19 is a side elevation view depicting a method for optimizing the CMM of FIG. 1 using an optimization jig.
Figure 21:
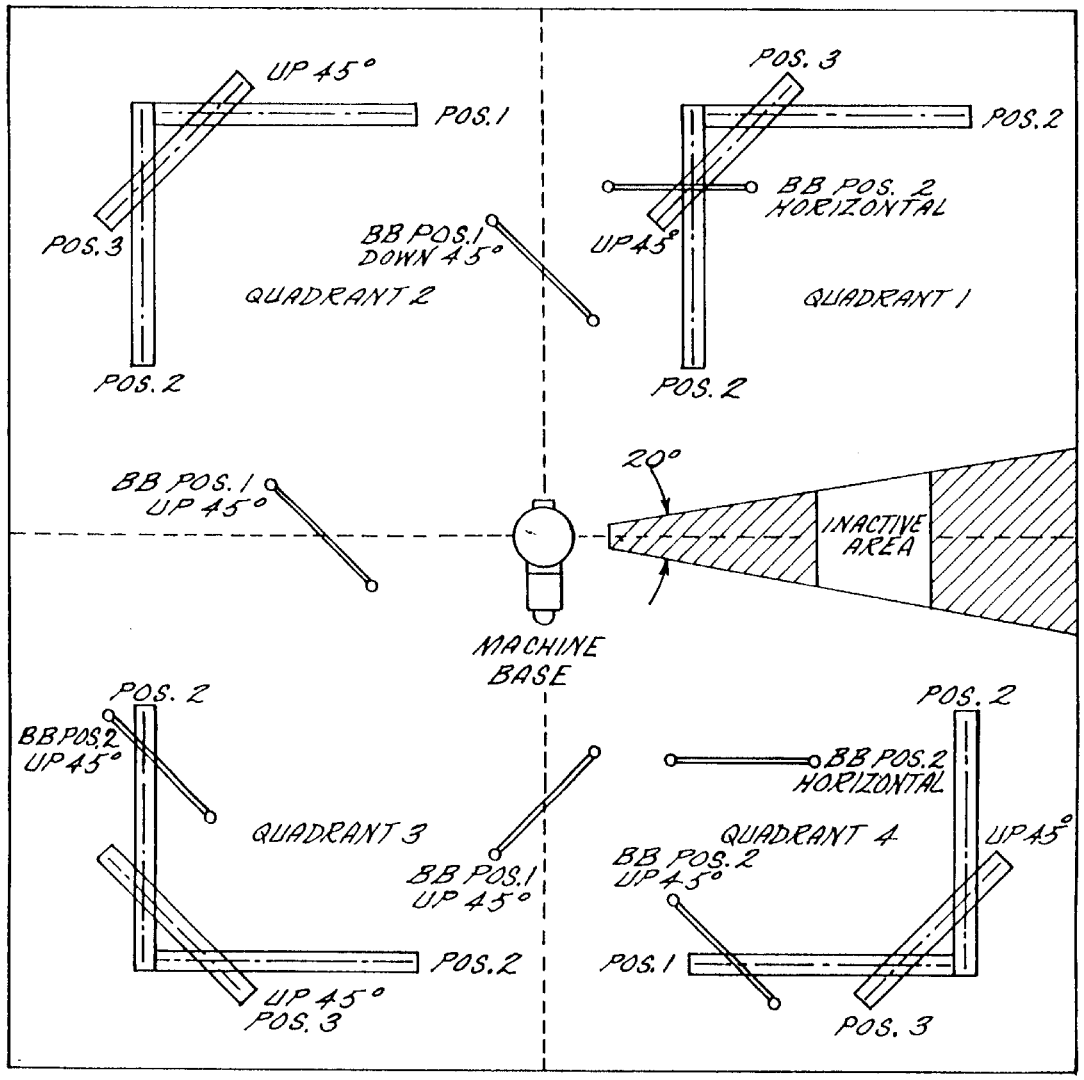
FIG. 21 is a schematic view showing a method of optimizing the CMM of FIG. 1 utilizing the apparatus of FIG. 19.

Turning now to FIGS. 19, 20 and 21 subsequent to assembly of CMM 10, the device is optimized or calibrated by altering the program software to account for any measured imperfections in assembly or machining. This initial calibration is an important feature of this invention and is accomplished in two stages. First, a variety of dimensional measurements are made which include positions, orientations and dimensions throughout the entire volume of the device. Subsequently, an optimization software program is used to determine the actual misalignments exiting at each of the joint axes and, hence, adjusting the kinematic formulas describing the motion of the arm. The general result is that imperfect machining and assembly is rendered perfect through the identification of those imperfections and their inclusion in the kinematics of the device.

Referring to FIGS. 19 and 20A–E, due to the huge amount of data and the requirement that it be accurately and easily obtained, a calibration and testing jig is shown at 320. Jig 320 is comprised of a large granite plate 322 to which is attached two spaced towers 324, 326 which can rotate 360 degrees in the horizontal plane. The CMM 10 is mounted on tower 326 and the adjustable dimensional testing jig 320 is mounted on the other tower 324. Jig 320 is mounted on an extendable vertical arm 328 which is vertically displaceable within an opening 330 through tower 324. Arm 328 is shown in a fully extended position.

Still referring to FIGS. 19 and 20, the adjustable dimensional testing jig 320 is comprised of three basic components: a 24 inch bar 332 on which is found a set of precision balls 334, a series of holes 336 positioned along its length, and a 24 inch precision step gauge 338 (shown in detail in FIGS. 20A–E) Arm 332 is used to measure the positions of the holes, steps and balls in a variety of positions for the testing jig and in all areas of the volume of the arm as shown in FIG. 21. This data is then optimized. In summary, the important optimization procedure can be described as follows. Standard test jig 320 with predetermined positions and orientations of objects is measured by arm 10. The data is then processed through a multi-variable optimization program created to provide the relative misalignment and dimension of all major components of the arm. Optimization is performed, at which time a calibration file is produced containing the overall characteristics of the arm. These overall characteristics and subsequent transducer readings are combined in a variety of kinematic formulas which will generate the X, Y and Z values in an absolute coordinate system.

Figure 14:
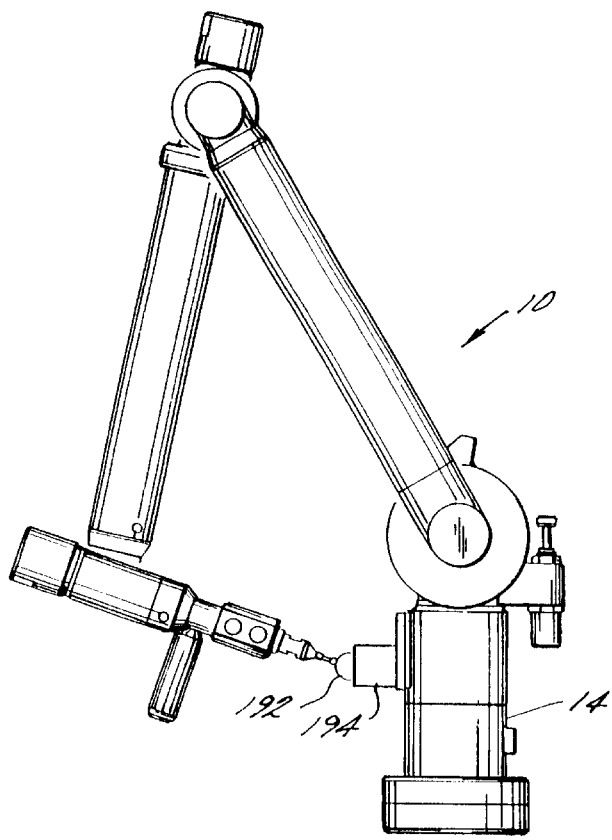
FIG. 14 is a side elevation view of the CMM of FIG. 1 depicting a probe tip calibration system.
Figure 15:
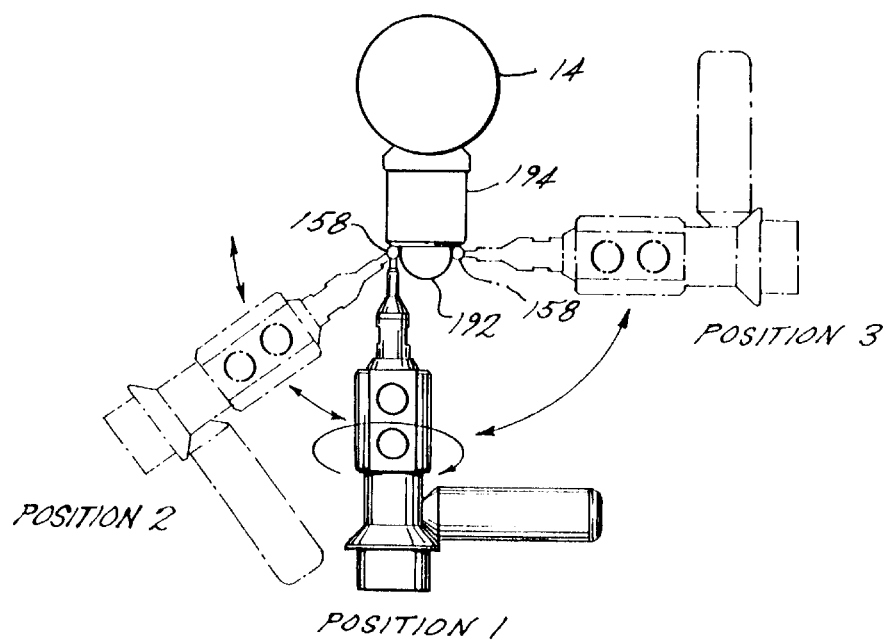
FIG. 15 is a schematic top plan view showing a method of calibrating the probe tip.

In order to further optimize performance, a novel reference ball 192 extends laterally from a detachable mount 194 attached to base 14 of CMM 10 (see FIGS. 14 and 15). By locating reference ball 192 at base 14, ball 92 represents the absolute origin of the device (0, 0, 0) corresponding to the X, Y and Z axes. Because of the known position of reference ball 192, positioning of the tips, as shown in FIG. 15, allows the present invention to determine the coordinates of the digitizer tip 158 in relationship to the last link of CMM 10. Knowledge of this position allows CMM 10 to determine the position of the center of that ball when making subsequent measurements. In a general sense, this means that a variety of different probes may then be attached depending on the particular application and each can be calibrated against the reference ball.

Because of the portable nature of the present invention, it will be subjected to significant mishandling and repositioning in a variety of environments. Therefore, the present invention includes a protocol by which the user may establish a degree of volumetric accuracy prior to using a device according to a convenient maintenance schedule. Volumetric accuracy is defined, according to ASME ANSI B891.1.12 (1989) standard, as the ability of a device to measure a fixed length which is positioned in its working volume in a variety of orientations. FIG. 16 shows the capability of this invention to do this using a first ballbar approach while FIGS. 17 and 18 depict a second ballbar approach.

FIG. 16 shows a standard ballbar 196 at each end of which is positioned a precision spherical ball 198, 200 which are mounted respectively into two magnetic sockets 202 and 204. Socket 202 is located at base 14 of CMM 10 and socket 204 is located at probe handle 56. As arm 12 is moved about, the sockets 202, 204 and balls 198, 200 rotate to accommodate this movement and CMM 10 is required to measure the fixed distance between the center of ball 200 and socket 204 at the handle 56 and the center of ball 198 at the base. Remembering, of course, that socket 202 at base 14 represents the 0, 0, 0 coordinate of CMM 10, calibration software in control box 16 then calculates the vector length from the 0, 0, 0 to the center of the ball at the probe and this length, which, of course, is unchanging during the test, must measure constantly throughout the entire volume through multiple configurations and rotations of the handle and other joints.

It will be appreciated that the socket 204 at the handle, may tend to be inconvenient and inconclusive when wanting to verify the accuracy of a particular probe on the handle. Hence, in accordance with an important feature of this invention, a novel cone socket ballbar as shown at 206 in FIG. 17 is used. Cone socket ballbar 206 includes a cone 208 at one end and two balls 210, 212 at the other end. The cone and balls are interconnected by a bar 207 having an angled portion 209 with then angle $\alpha$ preferably comprising 20 degrees. Ball 212 is attached to a mount 211 which extends laterally from bar 207. A ball probe 158 or point probe 160 is positioned in cone socket 208 and ball 210 can be mounted in the standard magnetic socket 202 of base 14 of CMM 10. As in the calibration method of FIG. 16, a number of positions of the ball and bar and joint positions are measured and the distance between cone socket 208 and ball 210 must remain constant. It is the nature of the positioning of ball socket 202 that the user will not be able to reach on the far side of the machine (position shown by Item 214). To this end, ball 212 is used as shown in FIG. 18. This allows the user to position cone ballbar 206 so as to reach on the reverse far side of CMM 10 in order to measure the distance between the center of ball 212 and the center of cone socket 208.

In accordance with the present invention, a novel method is provided wherein the CMM 10 is used for programming the operational paths for computer controlled devices such as multi-axis machine tools and robotics. As mentioned, a serious limitation in the usability of robotics and multi-axis machines is the time and effort required to program intricate and convoluted tool paths in an effort to perform a function such as with a welding or sanding robot or in a machine tool required to machine complex plastic molds. However, the 6-degree of freedom electrogoniometric device of this invention obtains provides the X, Y, Z position at the end of the probe as well as the I, J, K or direction cosines or orientation of the probe, all of which can be used in a novel method for programming such computer controlled devices. It is this position and/or orientation which defines the functionality of the multi-axis device or robot being programmed. The sixth axis of rotation usually is the rotational axis of the cutting or sanding tool or fixed position welding grips mounted on a sixth axis of a robot.

It will be appreciated that the programming of multi-axis devices in accordance with this invention applies to all degrees of freedom including 3, 4, 5, 6, 7 and up axes of rotation. For example, a coordinate measuring machine with only 3-degrees of freedom will be able to measure and store positional or orientation data (as opposed to both positional and orientation data) and to provide the tool path or manufacturing operation sequence to a 3-axis (or greater) machine center or robot. A CMM with at least 5-degrees of freedom will provide data on both position (X, Y, Z) and orientation (I, J, K) to a 5-axis (or greater) machine center or robot.

Figure 22:
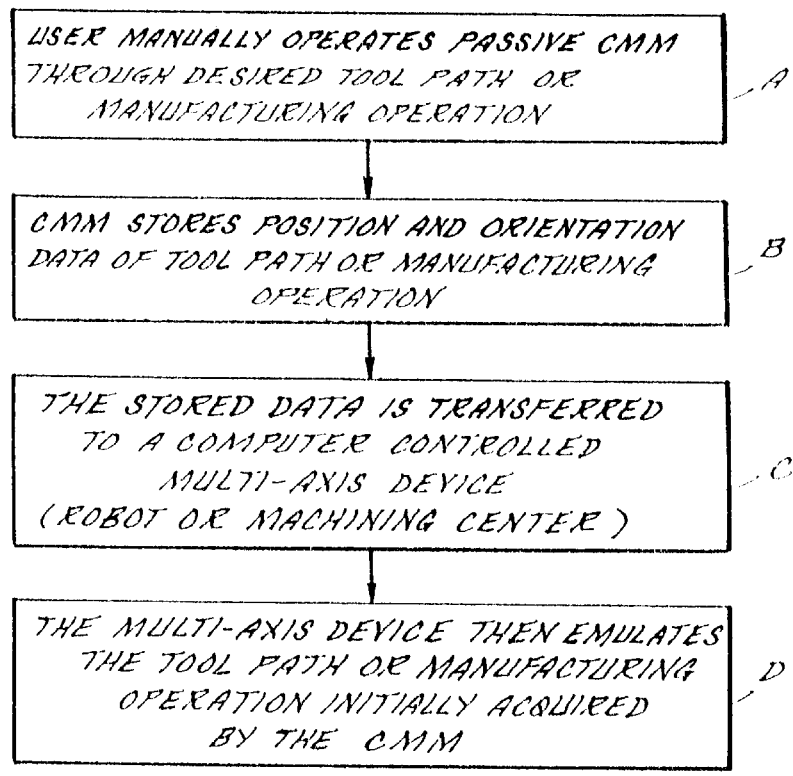
FIG. 22 is a flow chart depicting the method steps for programming computer controlled machine tools and robots using the CMM of the present invention.

In accordance with the method of this invention, and as schematically set forth in steps A–D of the flow chart of FIG. 22, the user simply manually operates the lightweight, easy-to-handle and passive electrogoniometric device of this invention with a simulated tool at its digitizer end for the emulation of either a tool path or manufacturing operation whereupon the CMM, at a predetermined rate, accumulates the X, Y, Z and/or I, J, K orientation data of the manufacturing tool. This data then is transferred according to industry standard formats to a CNC or computer numerically controlled device such as a robot or machining center for the reproduction of the motions emulated using the electrogoniometer 10.

Figure 23A:
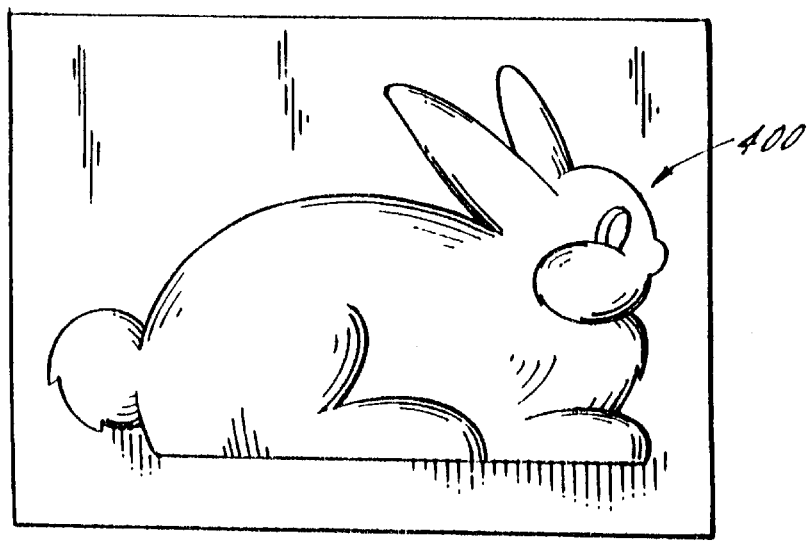
FIGS. 23A–C are sequential diagrammatic views of the method of FIG. 22 being performed in connection with a computer controlled machine tool.
Figure 23B:
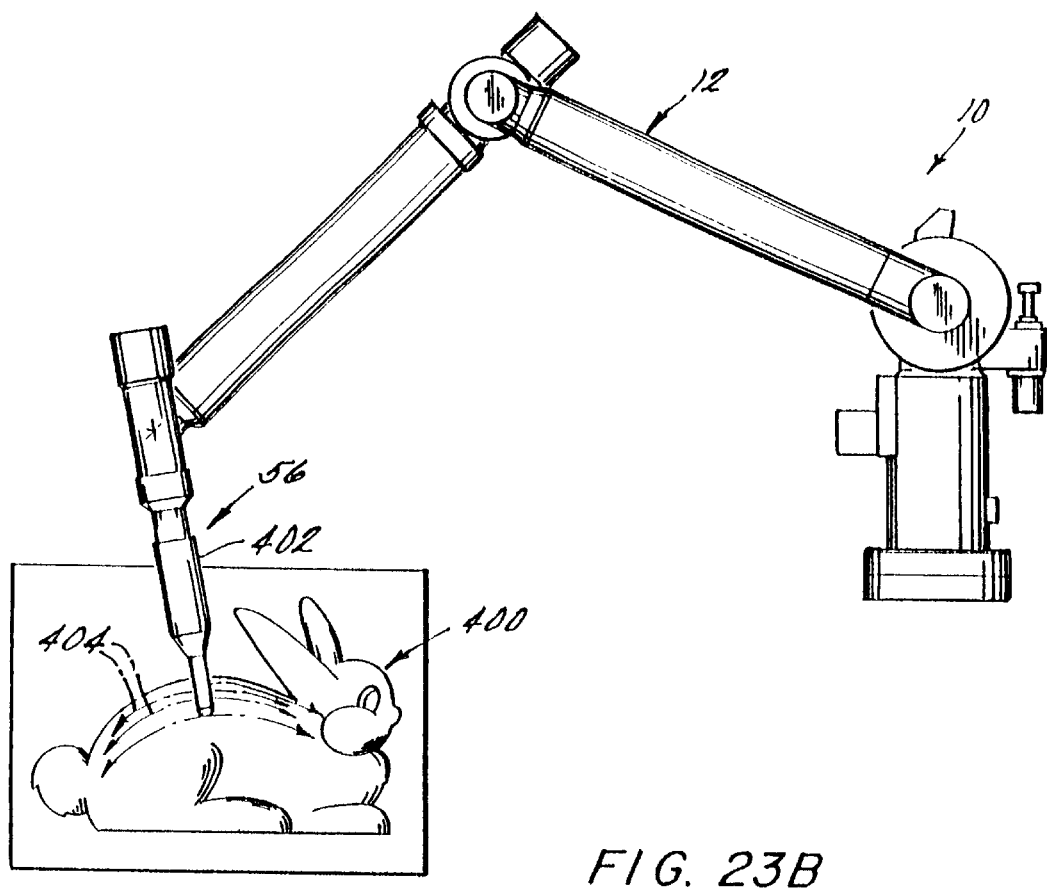
Figure 23C:
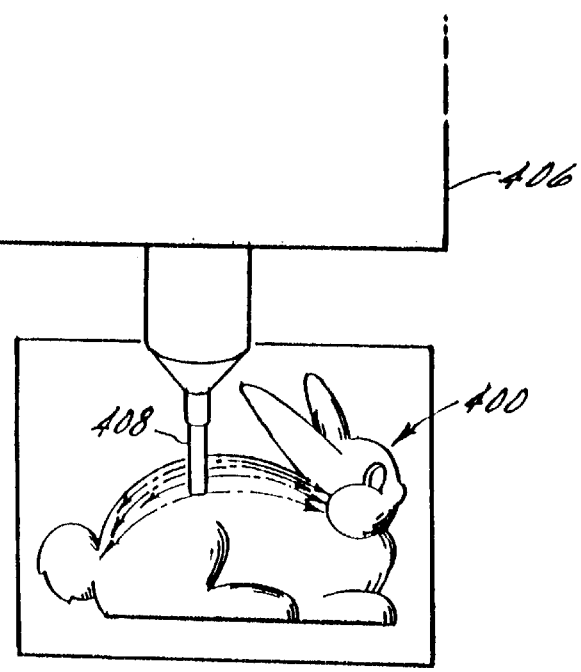

An example of this method applied to a computer controlled 5-axis machine tool is depicted in FIGS. 23A–C. In FIG. 23A, a complex part is shown which must be replicated on a multi-axis machining center. In this example, the complex part is a mold 400 for making chocolate bunnies. In order to replicate mold 400, the machining center must be programmed with the required tool path. Tool path is defined by position (X, Y, Z) or orientation (I, J, K) or both. If a 5-axis (or more) machining center or robot is required to be programmed, than data on both position and orientation is needed. If a 3-axis machining center or robot is required to be programmed, than only positional or orientation information is required.

In FIG. 23B, a CMM 10 has a cutting tool 402 (or simulated cutting tool) attached to a collet on the handle/probe assembly 56 at the end of measurement arm 12. The user then simulates the desired tool path as shown by the lines 404 (item A in FIG. 22). As described in detail above, the measurement arm 22 records the position and orientation of tool 402 and saves (or stores) this data to an industry formatted data file (item B in FIG. 22).

Next, referring to FIG. 23C, the stored data file is loaded into the microprocessor of a multi-axis machining center 406 (item C in FIG. 22). The complex part (chocolate bunny mold 400) is then replicated or emulated by machine tool 408 based on the position and orientation data originally acquired by CMM 10 (item D in FIG. 22).

At this point, the user may optimize the tool path and/or other cutting parameters such as speed. If more data is required, further simulation (e.g., steps A–C of FIG. 22 may be repeated) may be performed and the data appended to the original data set. Because the CMM is operated by a human, the data will contain some error caused by jitter and the like. Therefore, the data is preferably subjected to a known smoothing or refining CAD/CAM program such as MASTERCAM by CNC Software, Inc. or SURFCAM by Surfware, Inc.

Figure 24:
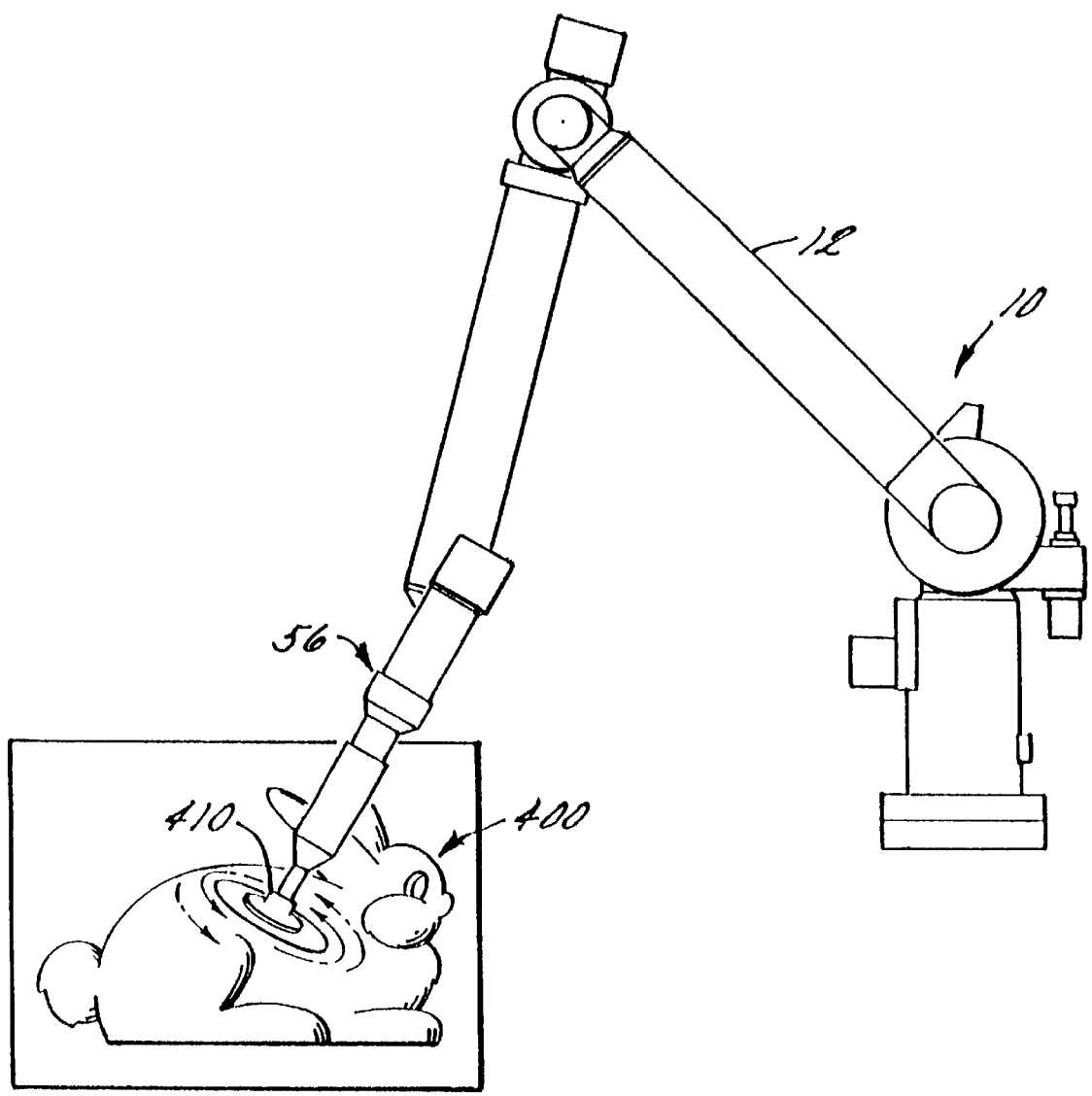
FIG. 24 is a diagrammatic view of the method of FIG. 22 being performed in connection with a computer controlled robot.

FIG. 24 depicts an example of the method of this invention in connection with a robotics application. The programming of a manufacturing operation for a multi-axis robot utilizes the same steps as described in FIGS. 22A–D or FIGS. 23A–C. In this case, a robot which is used for a manufacturing operation such as sanding the surfaces of complex parts is "simulation trained" by the use of a sanding disc tool 410 provided at the end of measurement arm 12. The position and orientation data is stored by CMM 10, and the data file (in a robot industry standard format) is then loaded into the robot processor and/or executed. Other examples of robotic (and machining) operations which are useful with the method of the invention include cutting, machining, polishing, grinding, painting, cleaning and welding.

Figure 25:
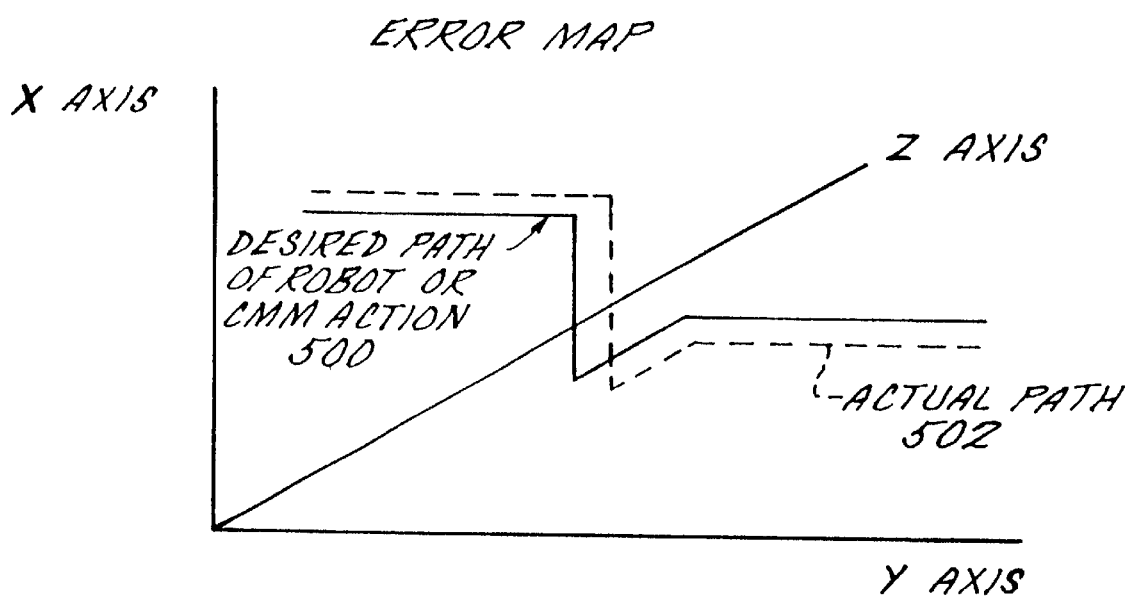
FIG. 25 is a diagrammatic view of a multi-axis error map prepared in accordance with the present invention depicting a desired path as compared to an actual path.

The current single point positional accuracy of the present invention is on the order of the typical robot repeatability. However, field experience has shown that the absolute accuracy of the typical robot is ten or more times inaccurate when compared to the typical robot repeatability stated above. In other words, a robot may repeat movements with very accurate consistency but the accuracy of the robot's actual movements may be relatively far removed from the programmed path. This is because the absolute accuracy of a robot is affected by many mechanical and electronic factors. In addition, robot kinematics are further affected by link and joint misalignments. The actual path inaccuracies are overcome by the present invention by means of an error map as depicted in FIG. 25. In FIG. 25, the programmed desired path is a solid line designated as 500. However, the dashed line 502 represents the actual path of the robot or other multi-axis device. This dashed line 502 is derived by using a CMM 10 in accordance with this invention to emulate (i.e., trace) the path taken by the robot and the resultant position and orientation data of the actual path is shown as the dotted line path 502. The result is an error map between the desired path 500 and the actual path 502 in three dimensional space. Appropriate software is then used to correct for the error through the computer. The result is that after correction, the lines 500 and 502 coincide within the required tolerances. The error map generated is used in standard industrial techniques for robotic optimization. The principle of optimization includes the submission of an error map to a mathematical formulation which attempts to minimize the errors between the actual and measured entities and through various statistical methodologies to create a set of kinematic parameters which when applied to the robot will improve its repeatability and precision. Examples of suitable optimization techniques of the type described herein include *Kinematic Calibration and Geometrical Parameter Identification for Robots,* Jean-Michaels Renders et al; IEEE Transaction on Robotics and Automation, Vol. 7, No. 6, December 1991; *A Closed Form Solution to the Kinematic Parameter Identification of Robot Manipulators,* Hangi Zhuang et al, Proceedings of the 1991 IEEE International Conference on Robotics and Automation, Sacramento, Calif., April 1991; *Improving The Precision Of A Robot,* Laurent P. Poulloy et al, IEEE Journal of Robotics and Automation, Page 62, 1984; *A General Procedure to Evaluate Robot Positioning Errors,* Ramesh N. Vaishnav et al, International Journal of Robotics Research, Vol. 6, No. 1, Spring: 1987 and *Robot Arm Geometric Line Parameter Estimation,* Samed A. Hayati et al, IEEE Journal of Robotics and Automation, Page 1477, 1983.

Figure 26:
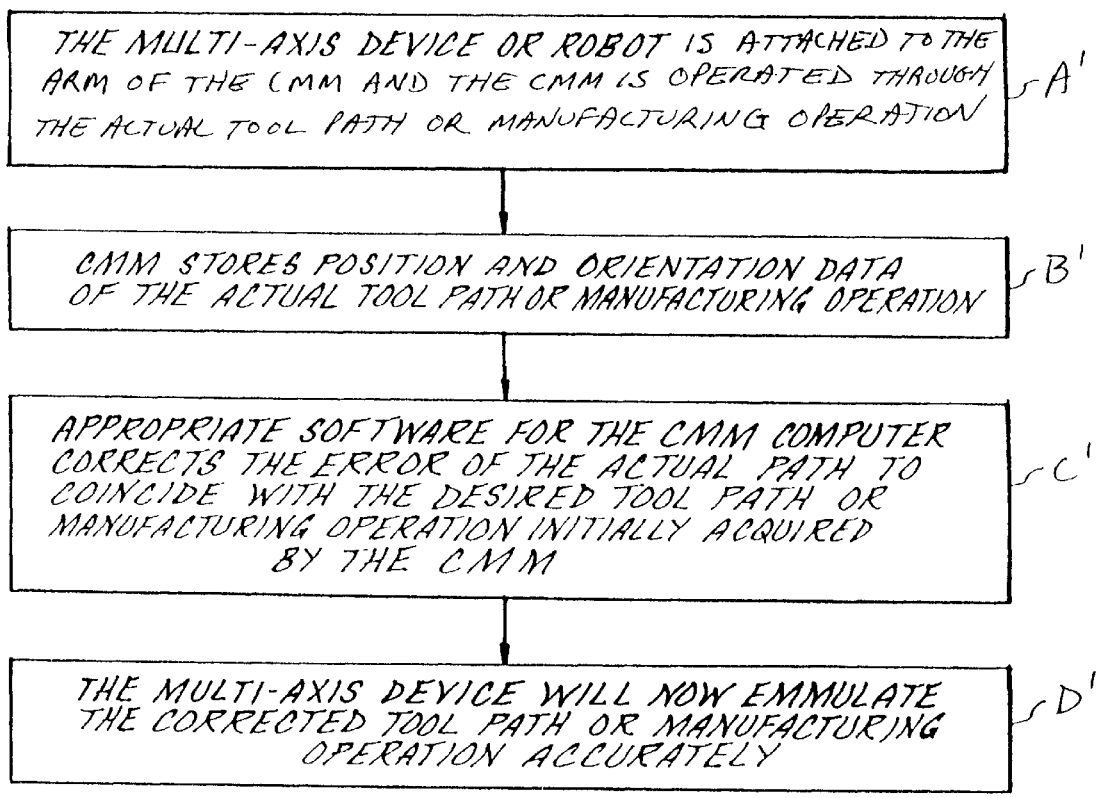
FIG. 26 is a flow chart depicting the method steps for programming computer controlled machine tools and robots using the CMM of the present invention so as to correct the actual path of FIG. 25 to coincide with the desired path of FIG. 25.
Figure 27:
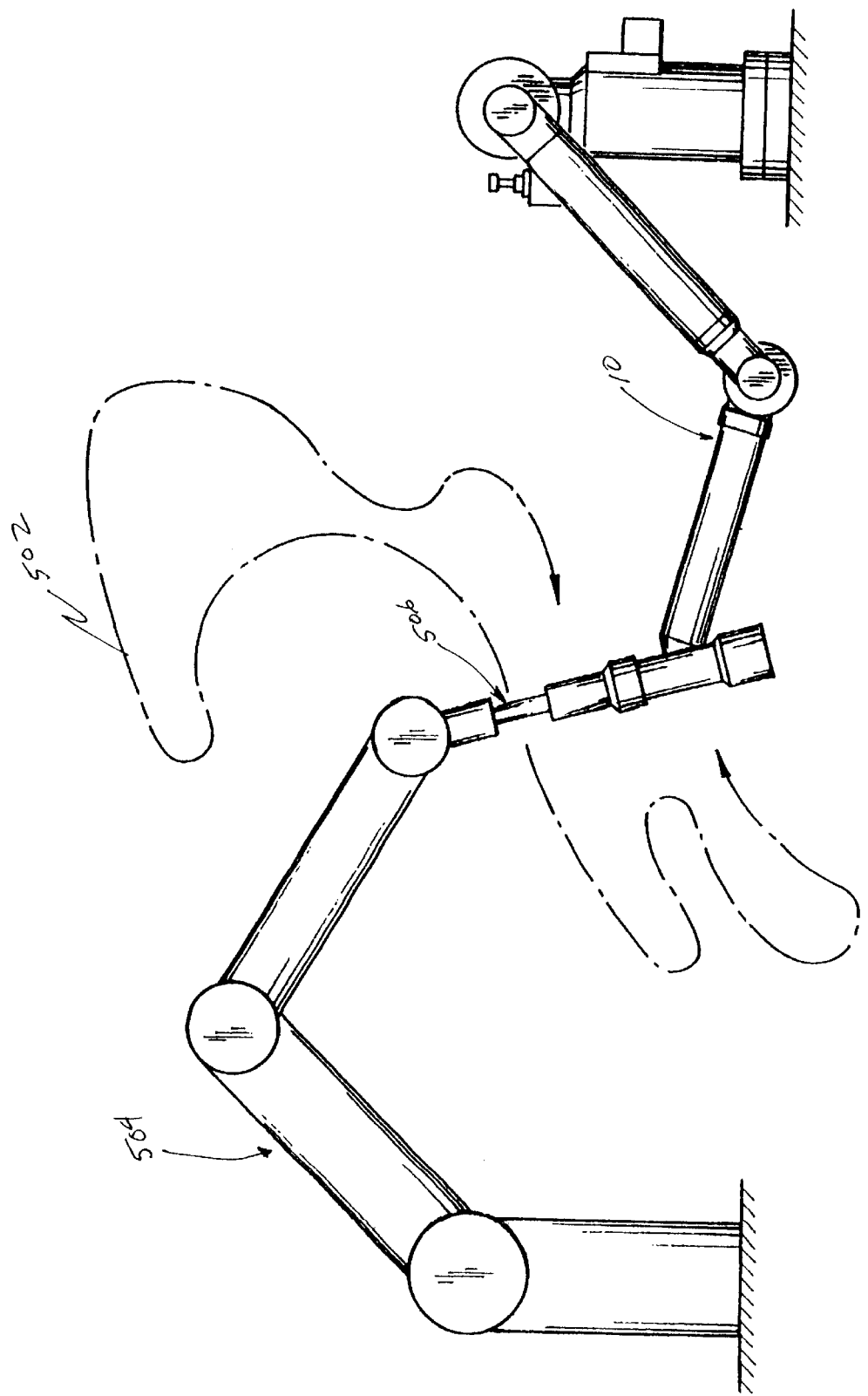

Referring to FIG. 27, in accordance with the method of this invention, and as schematically set forth in steps A'–D' of the flow chart of FIG. 26, the multi-axis device or robot 504 is directly attached such as by using mechanical linkage 506 to CMM 10 to trace the actual path 502 that the multi-axis device or robot performed (such as directed in step D of FIG. 22) and as shown in step A' of FIG. 26. Since the CMM arm 10 is simply attached to the robot 504 and the robot 504 is taken through a set of maneuvers which are measured by CMM 10, then the comparison of the information regarding where the robot thinks it is and where the articulated arm CMM says its is, is used to define the error map of FIG. 25. That is, the "error" between the desired position 504 of the robot 500 and the measured position 502 per the articulated arm CMM 10 is defined. Thus, in step B', the CMM 10 stores position and orientation data of the actual tool path or manufacturing operation 500 so as to derive the error map of FIG. 25. Following in step C' of FIG. 26, appropriate software in the CMM computer corrects the actual path 502 to coincide with the desired tool path or manufacturing operation 500 initially acquired by CMM 10 in, for example, step C of FIG. 22. Finally, as shown in step D' of FIG. 26, the multi-axis device 504 will now truly emulate the corrected tool path or manufacturing operation 500 accurately. Thus, the multi-axis device or robot 504 is calibrated to eliminate errors in space.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for generating an error map for multi-axis devices in order to improve the repeatability and/or precision of multi-axis devices comprising the steps of:

(1) attaching the measurement arm of a passive three dimensional coordinate measuring machine (CMM) having multiple degrees of freedom to a multi-axis device and operating the CMM through a selected 3-dimensional path or operation which emulates the desired proselected programmed path or operation of the multi-axis device;

(2) developing 3-dimensional data of at least one of (a) position and (b) orientation from step (1) and storing said data, said data defining the actual path or operation of the multi-axis device;

(3) comparing the actual path or operation to the desired preselected programmed path or operation;

(4) generating an error map comparing the actual path or operation to the desired preselected programmed path or operation; and (5) using said error map to improve the repeatability and/or precision of the multi-axis device;

wherein said CMM includes 6 degrees of freedom, said CMM comprises:

a movable arm having opposed first and second ends, said arm including a plurality of joints with each joint corresponding to a degree of freedom such that said arm is movable within a selected volume, each of said joints comprising a rotational transfer housing for housing a position transducer, said transducer producing a position signal;

a support base attached to said first end of said movable arm;

a probe attached to said second end of said movable arm; and an electronic circuit for receiving said position signals from said transducer and providing a digital coordinate corresponding to the position of said probe in a selected volume.

2. The method of claim 1 wherein:

said multi-axis device comprises a device having at least 3 axes and the data developed in step (2) comprises position or orientation data.

3. The method of claim 1 wherein:

said multi-axis device comprises a device having at least 5 axes and the data developed in step (2) comprises position and orientation data.

4. The method of claim 1 wherein:

said multi-axis device comprises a machining device.

5. The method of claim 1 wherein:

said multi-axis device comprises a robot.

6. The method of claim 1 wherein:

said operation is selected from the group consisting of welding, sanding, cutting, machining, polishing, grinding, painting and cleaning.

7. The method of claim 1 wherein:

a mechanical linkage is used to attach said CMM to said multi-axis device.

* * * * *